United States Patent
Zhong

(10) Patent No.: US 10,476,791 B2
(45) Date of Patent: Nov. 12, 2019

(54) METHOD FOR TRANSMITTING SERVICE SIGNAL BY USING ETHERNET CHANNEL AND COMMUNICATIONS DEVICE

(71) Applicant: Huawei Technologies Co., Ltd., Shenzhen (CN)

(72) Inventor: Qiwen Zhong, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 102 days.

(21) Appl. No.: 15/656,479

(22) Filed: Jul. 21, 2017

(65) Prior Publication Data

US 2017/0324657 A1 Nov. 9, 2017

Related U.S. Application Data

(63) Continuation of application No. PCT/CN2015/091878, filed on Oct. 13, 2015.

(30) Foreign Application Priority Data

Jan. 22, 2015 (CN) .......................... 2015 1 0031514

(51) Int. Cl.
*H04L 12/721* (2013.01)
*H04L 1/00* (2006.01)
(Continued)

(52) U.S. Cl.
CPC .............. *H04L 45/66* (2013.01); *H04L 1/00* (2013.01); *H04L 1/008* (2013.01); *H04L 1/0011* (2013.01);
(Continued)

(58) Field of Classification Search
CPC ......... H04L 45/66; H04L 1/00; H04L 1/0011; H04L 1/008; H04L 1/0086; H04L 43/028; H04L 69/323
(Continued)

(56) References Cited

U.S. PATENT DOCUMENTS

| 8,411,703 B1 | 4/2013 | Cory |
| 2008/0226292 A1* | 9/2008 | Li .................... H04J 14/0283 398/48 |

(Continued)

FOREIGN PATENT DOCUMENTS

| CN | 1691666 A | 11/2005 |
| CN | 101227450 A | 7/2008 |

(Continued)

OTHER PUBLICATIONS

Vissers "Draft revised G.709, version 3.4 for consent," ITU-T Draft, Study-Period 2009-2012, TD 95 (PLEN/15), pp. i-213, XP017445212, International Telecommunication Union, Geneva Switzerland (Sep. 28-Oct. 9, 2009).

(Continued)

*Primary Examiner* — Rownak Islam
(74) *Attorney, Agent, or Firm* — Leydig, Voit & Mayer, Ltd.

(57) ABSTRACT

Embodiments of the present invention provide a communications method and a communications device, so that multiple service signals can be borne in a same bearing area of a same Ethernet PCS lane. Therefore, it is implemented that multiple types of service signals share an Ethernet channel, so that the multiple types of service signals can share a link resource and an interface module resource. This provides a basis for convergence and integration of devices in a multi-technology system, and can improve utilization of link resources and reduce a quantity, a footprint, power consumption, maintenance costs, and the like of devices in a metropolitan area network.

18 Claims, 26 Drawing Sheets

(51) Int. Cl.
 *H04L 12/26* (2006.01)
 *H04L 29/08* (2006.01)
(52) U.S. Cl.
 CPC .......... *H04L 1/0086* (2013.01); *H04L 43/028* (2013.01); *H04L 69/323* (2013.01)
(58) Field of Classification Search
 USPC ........................................................ 370/401
 See application file for complete search history.

(56) References Cited

U.S. PATENT DOCUMENTS

| | | | |
|---|---|---|---|
| 2009/0190595 | A1 | 7/2009 | Jiang et al. |
| 2012/0044951 | A1* | 2/2012 | Han ................ H04L 69/323 370/419 |
| 2012/0057870 | A1 | 3/2012 | Dong et al. |
| 2012/0155486 | A1* | 6/2012 | Ahn ................ H04L 5/1423 370/433 |
| 2012/0213507 | A1 | 8/2012 | Decusatis et al. |
| 2015/0071311 | A1 | 3/2015 | Caggioni et al. |
| 2016/0197743 | A1 | 7/2016 | Su et al. |

FOREIGN PATENT DOCUMENTS

| | | |
|---|---|---|
| CN | 101615967 A | 12/2009 |
| CN | 101729940 A | 6/2010 |
| CN | 101841749 A | 9/2010 |
| CN | 103502985 A | 1/2014 |
| CN | 103875205 A | 6/2014 |
| EP | 2107705 B1 | 8/2016 |

OTHER PUBLICATIONS

"Common Public Radio Interface (CPRI); Interface Specification," CPRI Specification V6.1, pp. 1-129, Ericsson AB, Huawei Technologies Co. Ltd, NEC Corporation, Alcatel Lucent, and Nokia Networks (Jul. 1, 2014).

"IEEE Standard for Local and metropolitan area networks-Bridges and Bridged Networks," IEEE Computer Society, pp. i-1768, IEEE Std 802.1Q-2014, Institute of Electrical and Electronics Engineers, New York, New York (Dec. 19, 2014).

"IEEE Standard for Ethernet," IEEE Computer Society, pp. i-580, IEEE Std 802.3™-2012 Section One, Institute of Electrical and Electronics Engineers, New York, New York (Dec. 28, 2012).

"IEEE Standard for Ethernet, Section Two," IEEE Computer Society, pp. 1-780, IEEE Std 802.3-2012 Section Two, Institute of Electrical and Electronics Engineers, New York, New York (Dec. 28, 2012).

"IEEE Standard for Ethernet, Section Three," IEEE Computer Society, pp. 1-358, IEEE Std 802.3-2012 Section Three, Institute of Electrical and Electronics Engineers, New York, New York (Dec. 28, 2012).

"IEEE Standard for Ethernet, Section Four," IEEE Computer Society, pp. 1-732, IEEE Std 802.3-2012 Section Four, Institute of Electrical and Electronics Engineers, New York, New York (Dec. 28, 2012).

"IEEE Standard for Ethernet, Section Five," IEEE Computer Society, pp. 1-844, IEEE Std 802.3-2012 Section Five, Institute of Electrical and Electronics Engineers, New York, New York (Dec. 28, 2012).

"IEEE Standard for Ethernet, Section Six," IEEE Computer Society, pp. 1-400, IEEE Std 802.3-2012 Section Six, Institute of Electrical and Electronics Engineers, New York, New York (Dec. 28, 2012).

* cited by examiner

FIG. 4

| | 1 | 2 | 3 | 4 | 5 | ... | 5460 | 5461 | 5462 | 5463 | 5464 | 5465 | 5466 | ... | 10921 | 10922 | 10923 | 10924 | 10925 | 10926 | 10927 | ... | 16382 | 16383 | 16384 |
|---|---|---|---|---|---|---|---|---|---|---|---|---|---|---|---|---|---|---|---|---|---|---|---|---|---|
| 01 | AM00 | OH | | | | | | | | OH | | | | | | | | OH | | | | | | | |
| 02 | AM01 | OH | | | | | | | | OH | | | | | | | | OH | | | | | | | |
| 03 | AM02 | OH | | | | | | | | OH | | | | | | | | OH | | | | | | | |
| 04 | AM03 | OH | | | | | | | | OH | | | | | | | | OH | | | | | | | |

| | 1 | 2 | 3 | 4 | 5 | ... | 5460 | 5461 | 5462 | 5463 | 5464 | 5465 | 5466 | ... | 10921 | 10922 | 10923 | 10924 | 10925 | 10926 | 10927 | ... | 16382 | 16383 | 16384 |
|---|---|---|---|---|---|---|---|---|---|---|---|---|---|---|---|---|---|---|---|---|---|---|---|---|---|
| 01 | AM00 | OH | | | | | | | | OH | | | | | | | | OH | | | | | | | |
| 02 | AM01 | OH | | | | | | | | OH | | | | | | | | OH | | | | | | | |
| 03 | AM02 | OH | | | | | | | | OH | | | | | | | | OH | | | | | | | |
| ... | ... | OH | | | | | | | | OH | | | | | | | | OH | | | | | | | |
| 18 | AM17 | OH | | | | | | | | OH | | | | | | | | OH | | | | | | | |
| 19 | AM18 | OH | | | | | | | | OH | | | | | | | | OH | | | | | | | |
| 20 | AM19 | OH | | | | | | | | OH | | | | | | | | OH | | | | | | | |

METHOD FOR TRANSMITTING SERVICE SIGNAL BY USING ETHERNET CHANNEL AND COMMUNICATIONS DEVICE

CROSS-REFERENCE TO RELATED APPLICATIONS

This application is a continuation of International Patent Application No. PCT/CN2015/091878, filed on Oct. 13, 2015, which claims priority to Chinese Patent Application No. 201510031514.8, filed on Jan. 22, 2015. The disclosures of the aforementioned applications are hereby incorporated by reference in their entireties.

TECHNICAL FIELD

The present application relates to the field of communications technologies, and in particular, to a method for transmitting a service signal by using an Ethernet channel and a communications device.

BACKGROUND

With development of communications technologies, there comes into being different systems, such as a synchronous digital hierarchy (SDH), an optical transport network (OTN), a common public radio interface (CPRI), and the Ethernet. In a metropolitan area network, service requirements are complex, and generally, various devices compete with each other and complement each other. Consequently, multiple sets of devices run concurrently or in parallel in the metropolitan area network. For example, even in a room, there is one set of SDH devices, one set of OTN devices, one set of Ethernet switches or routers, and other grouping devices. Multiple links are configured correspondingly. However, resource utilization of the devices and the links is not high and is generally around 30% or below, and the multiple sets of devices occupy relatively much room space. Therefore, relatively large power consumption is caused, and multiple groups of staff are required for maintenance and management. This has become a priority problem that needs to be considered and resolved in the metropolitan area network.

SUMMARY

In view of this, embodiments of the present invention provide a method for transmitting a service signal by using an Ethernet channel and a communications device.

According to one aspect, an embodiment of the present invention provides a method for transmitting a service signal by using an Ethernet channel, where the Ethernet channel includes multiple Ethernet physical coding sublayer (PCS) lanes, each Ethernet PCS lane uses a bearing area with a fixed length to transmit a service signal, and the method includes: receiving a first service signal and a second service signal; multiplexing the first service signal and the second service signal to a bearing area of an Ethernet PCS lane, where one part of at least one bearing area of at least one Ethernet PCS lane of the Ethernet channel bears the first service signal, and the other part of the at least one bearing area bears the second service signal; and transmitting the first service signal and the second service signal that are borne in the bearing area of the Ethernet PCS lane.

According to another aspect, an embodiment of the present invention further provides a method for transmitting a service signal by using an Ethernet channel, where the Ethernet channel includes multiple Ethernet physical coding sublayer PCS lanes, each Ethernet PCS lane uses a bearing area with a fixed length to transmit a service signal, and the method includes: receiving a service signal transmitted over the Ethernet channel, where the service signal includes a first service signal and a second service signal, one part of at least one bearing area of at least one Ethernet PCS lane of the Ethernet channel bears the first service signal, and the other part of the at least one bearing area bears the second service signal; and distributing the first service signal and the second service signal.

According to the communications method and a communications device that are provided in the embodiments of the present invention, multiple service signals can be borne in a same bearing area of a same Ethernet PCS lane. Therefore, it is implemented that multiple types of service signals share an Ethernet channel, so that the multiple types of service signals can share a link resource and an interface module resource. This provides a basis for convergence and integration of devices in a multi-technology system, and can improve utilization of link resources and reduce a quantity, a footprint, power consumption, maintenance costs, and the like of devices in a metropolitan area network.

BRIEF DESCRIPTION OF DRAWINGS

The following briefly describes the accompanying drawings. The accompanying drawings show some embodiments of the present invention, and a person of ordinary skill in the art may still derive other drawings from these accompanying drawings without creative efforts.

FIG. 4 is a diagram of a correspondence between a 64B/66B coded data stream and a code block;

FIG. 6 is a schematic diagram of an Ethernet frame structure according to an embodiment of the present invention;

FIG. 10 is a schematic diagram of an Ethernet frame structure according to Embodiment 1 of the present invention;

FIG. 11 is a diagram of distribution of a frontend service and a backend service according to Embodiment 1 of the present invention;

FIG. 12 is a schematic diagram of an overhead bearing area of an Ethernet frame structure according to Embodiment 1 of the present invention;

FIG. 17 is a schematic structural diagram of a signal received at a reconciliation sublayer according to Embodiment 1 of the present invention;

FIG. 18 is a schematic diagram of an overhead bearing area according to Embodiment 2 of the present invention;

FIG. 19 is a schematic diagram of an overhead bearing area according to Embodiment 2 of the present invention;

FIG. 22 is a schematic diagram of a frame structure used when OTN signals share an Ethernet interface according to Embodiment 3 of the present invention;

DESCRIPTION OF EMBODIMENTS

To make objectives, technical solutions, and advantages of embodiments of the present invention clearer, the following clearly describes technical solutions in embodiments of the present invention with reference to the accompanying drawings.

Figure 1:
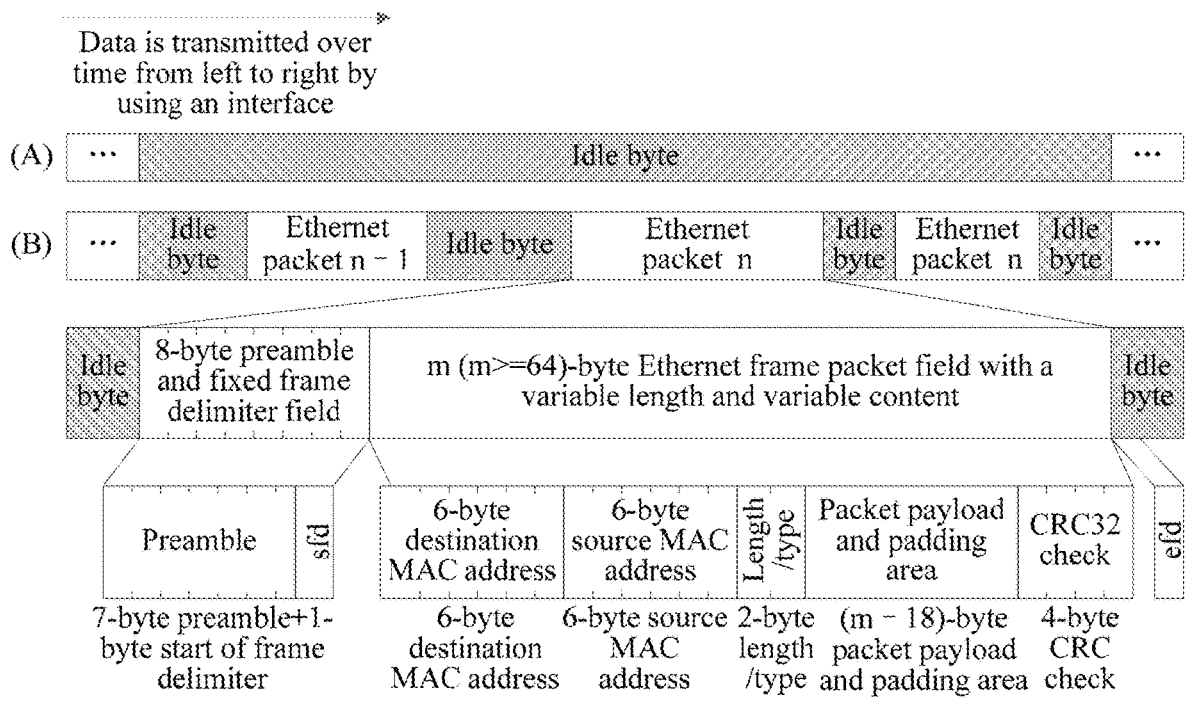
FIG. 1 shows a data structure of data to be transmitted in the Ethernet.

FIG. 1 shows a manner of transmitting data in the Ethernet. As shown in FIG. 1, (A) if no data is to be transmitted in a period of time, idle bytes are sent continuously to maintain normal transmission and reception of hardware on both sides of an Ethernet interface; (B) if packet data needs to be transmitted during this period of time, the packet data is transmitted after occupying idle bytes. A packet has a variable length within a particular range. There are at least 12 idle bytes between two packets, and a length thereof is not limited.

As shown in FIG. 1, typical encapsulation of an Ethernet packet is as follows. An octet (byte) is used as a base unit. One Ethernet packet includes the following in sequence: a 7-byte preamble "0xAA 0xAA 0xAA 0xAA 0xAA 0xAA", a 1-byte start of frame delimiter SFD "0xAB", a 6-byte destination address, a 6-byte source address, a 2-byte packet type/length information, a packet payload information and padding information byte with a length of at least 46 bytes (PAD is used for padding to reach 46 bytes when a payload is less than 46 bytes), and a 4-byte frame check byte used to check integrity of the packet. When the 7-byte preamble and the start of frame byte (SFD) are not included, the packet has a minimum of 64 bytes and a maximum of 1518 bytes. When the preamble and the start of frame byte are included, the packet has a minimum of 72 bytes and a maximum of 1526 bytes. As a control byte, one idle byte following the Ethernet packet is also referred to as an end of frame delimiter (EFD).

Figure 2:
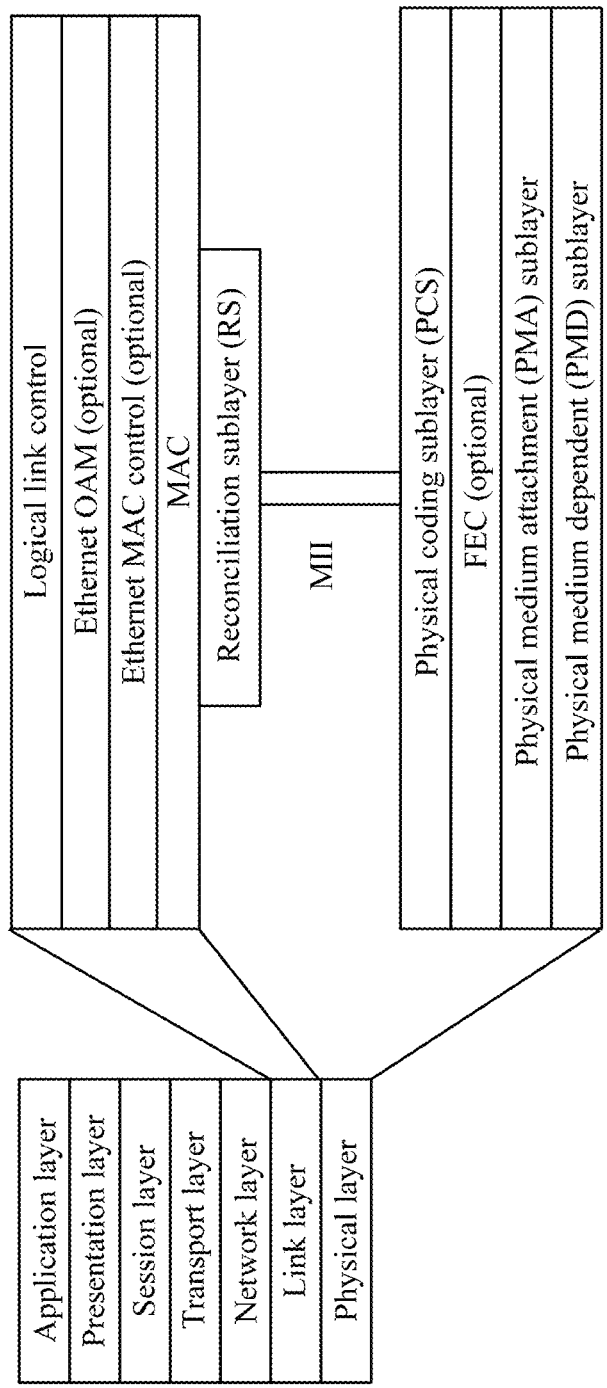
FIG. 2 shows a layer reference model of an Ethernet interface.

FIG. 2 shows a layer reference model of an Ethernet interface. As shown in FIG. 2, the Ethernet includes seven layers: an application layer, a presentation layer, a session layer, a transport layer, a network layer, a link layer, and a physical layer (PHY). The link layer includes a logical link control layer, an Ethernet operations, administration and management (OAM) layer (optional), an Ethernet media access control (MAC) control layer (optional), and a MAC layer. The physical layer includes a reconciliation sublayer (RS), a physical coding sublayer (PCS), an forward error correction (FEC) layer (optional), a physical medium attachment (PMA) sublayer, and a physical medium dependent (PMD) sublayer. The reconciliation sublayer and the PCS layer are connected by using a medium independent interface (MII). Starting from a 100M Ethernet, logical MII interfaces with constant concept meanings gradually come into being, and are differently named according to increasing rates. A gigabit media-independent interface (GMII) interface is an interface with a physical interface rate of 1 Gbps, a 10 gigabit media-independent interface (XGMII) is an interface with a physical interface rate of 10 Gbps, a 40 gigabit media-independent interface (XLGMII) is an interface with a physical interface rate of 40 Gbps, a 100 gigabit media-independent interface (CGMII) is an interface with a physical interface rate of 100 Gbps, and the like. A logical MII interface becomes sophisticated with evolution of an interface rate. When a rate of an interface is 100M, the interface has a data bit width of 4 bits (0.5 byte); for a GE, an interface has a data bit width of 8 bits (1 byte); for a 10 GE, an interface has a data bit width of 32 bits (4 bytes). All MII interfaces with rates exceeding 10G become abstract logical interfaces, and data bit widths thereof are defined to be 64 bits (8 bytes).

Typically, from top to bottom, the first functional layer of the physical layer of the interface is a reconciliation sublayer. The reconciliation sublayer is connected to other PHY functional layers including the PCS physical coding sublayer by using an MII interface, to perform bidirectional data transmission, that is, transmission and reception. For MII interface data constructed at the reconciliation sublayer in a transmit direction, packets are mainly obtained from a packet buffer at an agreed physical interface rate according to a data bit width of an MII interface. The Ethernet packet data is transmitted in parallel to the physical coding sublayer by using the MII interface with the determined rate and bit width. The first byte of a preamble of the packet is replaced with an S byte. When no packet is to be transmitted, control byte information, such as an idle byte, a T byte, and an 0 byte, is used for padding, and a format of the MII interface data needs to meet a requirement of the physical coding sublayer. For example, a frame of a 10GE XGMII interface needs to be aligned with a boundary of the XGMII interface, and a start of frame byte S can be placed only at a first lane of an MII. In a receive direction, Ethernet packet data is recovered from corresponding MII interface data that is received from the coding sublayer by using the MII interface and that is obtained through decoding, and is stored in a packet buffer. Various padding and control byte information is discarded and terminated.

TX_EN/TX_ER/TXC of the MII interface is used to indicate a start of the first byte of the preamble of the Ethernet packet and an end of the last byte of the packet. At the reconciliation sublayer, the first byte of the preamble is replaced with a /S/ character, and the first control character following the Ethernet packet is a /T/ character. Bytes between the /S/ character and the /T/ character are data characters. Characters other than the data characters are control characters, as shown in the left of the following figure. It should be noted that 8-octet data characters have 256 types of legitimate information combinations: 0x00 to 0xFF, but control characters have only a few legitimate combinations, such as /I/, /S/, and/T/ control characters. /I/ and I have a same meaning, and both indicate idle character bytes in interframe space. /S/ and S have a same meaning, and both indicate a start of frame character of an Ethernet frame. /T/ and T have a same meaning, and both indicate an end of frame character of an Ethernet frame. For example, common characters for the XGMII interface are shown in the following table.

Figure 3:
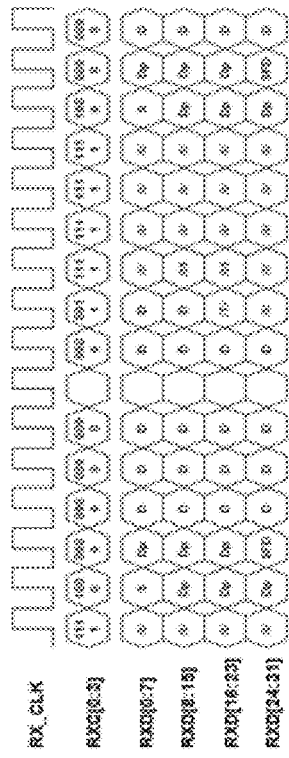
FIG. 3 is a schematic diagram of a method for transmitting data by using a media-independent interface (MII) in the Ethernet.
Figure 3:
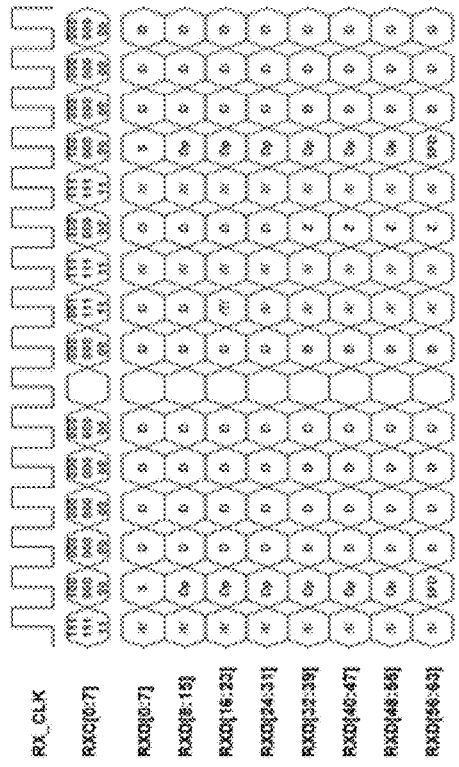
Figure 3:
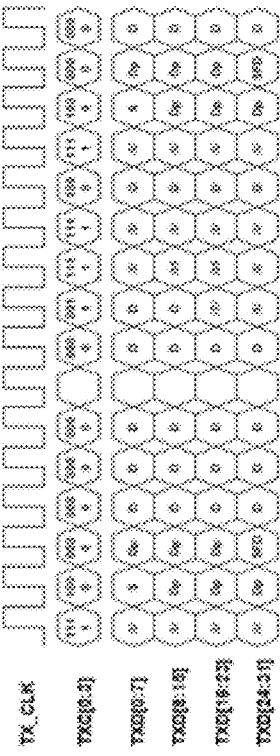
Figure 3:
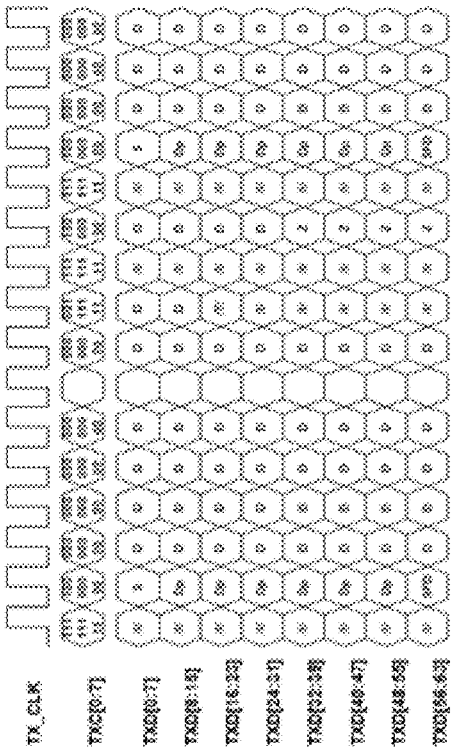

As shown in FIG. 3, if a 10G XGMII interface with a 32-bit data bit width is used, TX_CLK, TXC[0:3], TXD[0:7], TXD[8:15], TXD[16:23], and TXD[24:31] are transmitted in parallel from the reconciliation sublayer to the PCS layer. For example, when a value of TXC[0:3] is 1000, it indicates that TXD[0:7] is a control byte to be transmitted, and TXD[8:15], TXD[16:23], and TXD[24:31] are data bytes to be transmitted. A case in a receive direction is similar thereto if an interface with a 64-bit width is used. The data byte is data to be transmitted, and for a specific meaning of the control byte, refer to Table 1. For example, if TXC[0:3] indicates that TXD[0:7] is a control byte and a value borne by TXD[0:7] is 0xFB, it can be learned from Table 1 that TXD[0:7] bears a start of frame character /S/.

This manner of transmitting information by using the MII may be combined with a coding manner of the PCS layer. For example, for 64b/66b coding, 64-bit information required for coding is from two consecutive pieces of 32-bit width information of an XGMII interface, or one piece of 64-bit width information of an XL/CGMII, and is information of 8 bytes in total. Whether each byte is a control byte

TABLE 1

| TXC/RXC 1 bit, a binary value | TXD/RXD 8 bits, a hexadecimal value | Marked as | Character descriptions of an XGMII interface |
|---|---|---|---|
| 0b0 | 0x00 to 0xFF | /D/, D | Data bytes in a packet; transparent data information 0x00 to 0xFF of a user |
| 0b1 | 0x00 to 0x05 | — | Reserved and not used; no clear meaning temporarily |
| 0b1 | 0x06 | /LI/ | LPI, low power idle indication, a signal that instructs the interface to enter a low-power-consumption mode; optional |
| 0b1 | 0x07 | /I/, I | Normal idle character byte in interframe space |
| 0b1 | 0x08 to 0x9B | — | Reserved and not used; no clear meaning temporarily |
| 0b1 | 0x9C | /O/, O | Control character bytes for indicating a link status in interframe space; following 3 bytes are used to indicate a specific meaning, a local error, a remote error, and the like |
| 0b1 | 0x9D to 0xFA | — | Reserved and not used; no clear meaning temporarily |
| 0b1 | 0xFB | /S/, S | Start of frame character; used to replace the first byte of a preamble |
| 0b1 | 0xFC | — | Reserved and not used; no clear meaning temporarily |
| 0b1 | 0xFD | /T/, T | End of frame character; the first idle control character inserted after an end of a frame |
| 0b1 | 0xFE | /E/, E | Error character, used to indicate that an error occurs |
| 0b1 | 0xFF | — | Reserved and not used; no clear meaning temporarily |

The GMII uses an 8-bit width and a 125 MHz clock, and the XGMII uses a 32-bit width and a 312.5 MHz clock. The XGMII uses TXC 4 bits to indicate that four 8 octets of 32-bit data are data characters or control characters. 40GE/100GE further extends a bit width of an MII interface to 64 bits. The MII interface is only used as an abstract logical interface. A physical interface form is not defined any more. Subsequent 25GE, 50GE, 400GE, and the like are likely to follow this rule.

FIG. 3 shows a schematic diagram of transmitting data by using an MII interface. TX_CLK in the figure is a clock signal transmitted from a reconciliation sublayer to a PCS layer, TXC is used to indicate a to-be-transmitted control signal, and TXD is to-be-transmitted data. TXC includes a sequence of 0 and 1, 0 indicates that a corresponding to-be-transmitted byte is a data byte, and 1 indicates that a corresponding to-be-transmitted byte is a control byte.

or a data byte is indicated by TXC information. Bytes such as /S/ and /O/ are restricted on the first byte lane of the MII interface, and the 40GE and the 100GE continue to use 64b/66b coding, but a 64-bit-width MII interface is used and a location of the /S/ character is restricted to that of the first byte of 8 bytes of an XLGMII/CGMII interface. Therefore, there are fewer types of corresponding 64b/66b PCS code blocks, only 12 types of code blocks in total.

Figure 4:
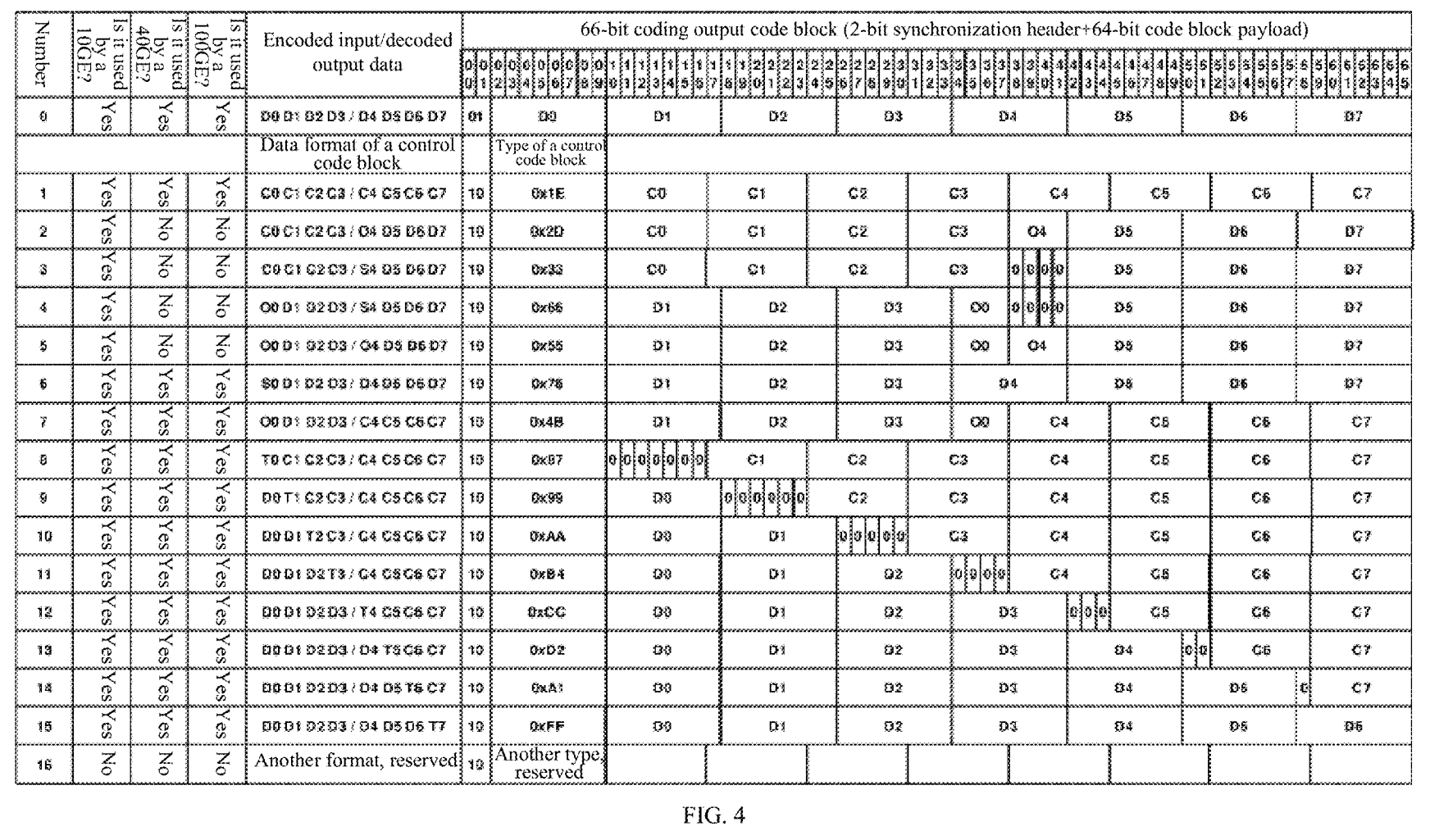

FIG. 4 shows a 64b/66b coding table. A 64b/66b code block includes 66 bits, including a 2-bit synchronization header and an 8-byte bearing area. When 2 bits of the synchronization header indicate 01, 8 bytes following the synchronization header in the code block are data bytes. When 2 bits of the synchronization header indicate 10, 8 bytes following the synchronization header in the code block are a combination of control bytes and data bytes, and in this case, the first byte is used to indicate a codeword structure. In the coding table of FIG. 4, D is used to indicate a data byte, C is used to indicate a control byte (for a specific meaning of a value borne in the control byte, refer to Table 1), and 0 indicates that 0 is used for padding.

The foregoing is an overview of the Ethernet technology. Because the Ethernet is widely used, and hardware and interface devices have a good scale effect, costs are extremely low. At present, 40GE, 100GE, NG100GE, and next-rate (such as 400GE and 1000GE) Ethernet interfaces will also have an advantage of relatively low costs.

The present invention relates to a multiplexing technology, supports multiplexing and share of a link resource in a multi-technology system, and supports hybrid integration of devices in the multi-technology system, so as to use a set of integrated devices and a set of integrated links for networking. This improves utilization of the devices, reduces power consumption, and reduces a footprint and investments in management and maintenance.

Figure 5:
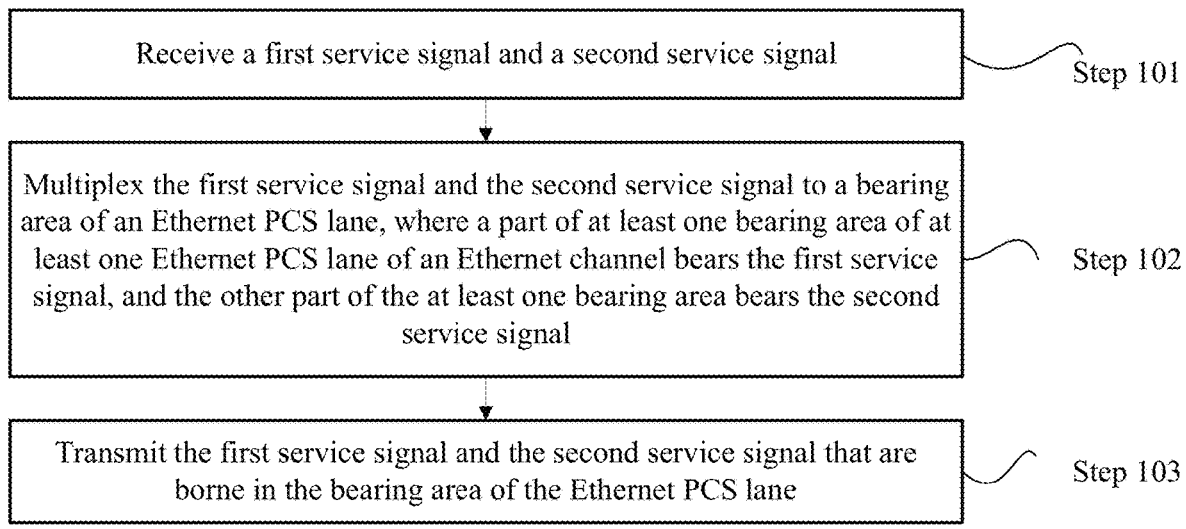
FIG. 5 is a flowchart of a method performed in a transmit direction according to an embodiment of the present invention.

According to one aspect, as shown in FIG. 5, an embodiment of the present invention provides a method for transmitting a service signal by using an Ethernet channel. The Ethernet channel includes multiple Ethernet physical coding sublayer PCS lanes, and each Ethernet PCS lane uses a bearing area with a fixed length to transmit a service signal. The method includes the following steps:

Step 101. Receive a first service signal and a second service signal.

Step 102. Multiplex the first service signal and the second service signal to a bearing area of an Ethernet PCS lane, where one part of at least one bearing area of at least one Ethernet PCS lane of the Ethernet channel bears the first service signal, and the other part of the at least one bearing area bears the second service signal.

Step 103. Transmit the first service signal and the second service signal that are borne in the bearing area of the Ethernet PCS lane.

With reference to the foregoing method, optionally, the at least one bearing area includes an overhead bearing area and a payload bearing area. The overhead bearing area bears bandwidth indication information. The bandwidth indication information is used to indicate bandwidth, occupied by the first service signal, in the payload bearing area. Further, optionally, the bandwidth indication information is bandwidth granularity quantity information. The bandwidth granularity quantity information is used to indicate a quantity of bandwidth granularities, occupied by the first service signal, in the payload bearing area, and each bandwidth granularity has a fixed length.

With reference to all the foregoing implementations, optionally, the first service signal is an Ethernet service signal, a synchronous digital hierarchy (SDH) service signal, an optical transport network (OTN) service signal, or a common public radio interface (CPRI) service signal. The second service signal is an Ethernet service signal.

With reference to all the foregoing implementations, optionally, the receiving a first service signal and a second service signal includes: transmitting a service identifier signal and a clock signal to a transmit end of the first service signal and a transmit end of the second service signal, and receiving the first service signal transmitted by the transmit end of the first service signal and the second service signal transmitted by the transmit end of the second service signal. When the service identifier signal is a first identifier, the transmit end of the first service signal transmits the first service signal, and the transmit end of the second service signal skips transmitting a service signal. When the service identifier signal is a second identifier, the transmit end of the second service signal transmits the second service signal, and the transmit end of the first service signal skips transmitting a service signal. The first identifier is corresponding to the first service signal, and the second identifier is corresponding to the second service signal.

With reference to all the foregoing implementations, optionally, the transmitting the first service signal and the second service signal that are borne in the bearing area of the Ethernet PCS lane includes: transmitting the at least one bearing area of the at least one Ethernet PCS lane, and transmitting the clock signal and an indication signal. The indication signal is used to indicate a location of an alignment marker AM corresponding to the at least one bearing area. Further, optionally, the indication signal is further used to indicate a location of the overhead bearing area of the at least one bearing area and a location of the payload bearing area of the at least one bearing area.

As described above, referring to FIG. 1, in a conventional Ethernet, when no data is to be transmitted, idle bytes are continuously sent; when data (a length of the data is variable) needs to be transmitted, corresponding data is transmitted. At an Ethernet physical layer PHY layer, corresponding idle bytes are removed, and a corresponding alignment marker (AM) is inserted at an interval of fixed bytes, for a receive end to align and recover data. In this way, a corresponding Ethernet is configured according to peak traffic, and generally, bandwidth is not fully used, and cannot be used to transmit another service either. As a result, a waste of bandwidth is caused.

In this embodiment of the present invention, the Ethernet PCS lane is considered as a container with a fixed capacity, and can be used to transmit multiple types of service signals together. Certainly, the Ethernet PCS lane can be used to transmit only one type of service signal.

Specifically, at a transmit side, a service signal is received at a reconciliation sublayer RS first. The service signal may be an Ethernet service signal, a CPRI service signal, an OTN signal, or a fiber channel service signal of a fiber channel (FC) from an upper layer, may be an SDH signal, or may be any combination of these signals. For example, the service signal may be two or more Ethernet service signals, or may be an Ethernet service signal and a CPRI service signal.

Optionally, herein, corresponding service signals may be received at the reconciliation sublayer by using independent physical interfaces of the service signals or by using logical ports of the service signals.

Manners of performing receiving by using different logical ports are described in the following. Different logical ports may share one physical port. A case in which there are two service signals is used as an example, and other cases are similar. The two service signals are referred to as a first service signal and a second service signal respectively. A service identifier signal and a clock signal are transmitted at the reconciliation sublayer to a transmit end of the first service signal and a transmit end of the second service signal, and the first service signal transmitted by the transmit end of the first service signal and the second service signal sent by the transmit end of the second service signal are received at the reconciliation sublayer. When the service identifier signal is a first identifier, the transmit end of the first service signal transmits the first service signal, and the transmit end of the second service signal skips transmitting a service signal. When the service identifier signal is a second identifier, the transmit end of the second service signal transmits the second service signal, and the transmit end of the first service signal skips transmitting a service signal. The first identifier is corresponding to the first service signal, and the second identifier is corresponding to the second service signal. The transmit end of the first service signal and the transmit end of the second service signal are logical transmit ends, and may be a same hardware component physically. That is, the hardware component has a capability of processing both the first service signal and the second service signal. Certainly, the transmit end of the first service signal and the transmit end of the second service signal may be different hardware components.

Optionally, a corresponding correspondence between an Ethernet PCS lane and a service signal is stored at the reconciliation sublayer. The correspondence may be stored in a correspondence table or may be stored in another manner. For example, each Ethernet PCS lane may be corresponding to one or more service signals. In an implementation, each Ethernet PCS lane may be corresponding to 0 to 2 service signals. That is, zero means that no service is to be borne, one means that one service is to be borne, and two means that two services are to be borne. Each service signal uses a corresponding service identifier, and the service identifier may be the same as an identifier borne in the service identifier signal. Optionally, an Ethernet PCS lane may be corresponding to two service signals. One of the service signals is referred to as a frontend service, and the other one is referred to as a backend service. A corresponding correspondence table may store an identifier of the Ethernet PCS lane: an identifier of the frontend service and an identifier of the backend service. The identifier of the frontend service and the identifier of the backend service are corresponding to the identifier of the Ethernet PCS lane.

Correspondingly, when the transmit end of the first service signal or the transmit end of the second service signal receives a corresponding service identifier signal and clock signal, if an identifier indicated by the corresponding service identifier signal matches a local identifier, a corresponding service signal is transmitted to the reconciliation sublayer during a corresponding clock cycle. If the identifier indicated by the corresponding service identifier signal does not match the local identifier, no service signal is sent to the reconciliation sublayer during a corresponding clock cycle. An identifier is allocated at the reconciliation sublayer during each clock cycle to form a service identifier signal. The service identifier signal is broadcast to the transmit end of the first service signal and the transmit end of the second service signal. In this way, a conflict caused because different transmit ends transmit service signals to the reconciliation sublayer at the same time can be avoided.

A 40GE Ethernet is used as an example. As shown in FIG. 6, in the 40GE Ethernet, there may be a frame structure of 4-row and 16384-column 64/66b code blocks. The frame structure that is continuous in time forms an Ethernet channel. Each row of the continuous frame structure is equivalent to an Ethernet PCS lane. An Ethernet with another rate is similar, and the manner in this embodiment of the present invention is also applicable, for example, a 100GE Ethernet includes a frame structure of 20-row and 16384-column 64/66b code blocks. In this embodiment of the present invention, a 64/66b code block is used as a granularity, or a data block of another size may be used as a granularity. For example, a bit is used as a granularity, a byte is used as a granularity, or 10 bytes are used as a granularity. This is not limited in this embodiment of the present invention. As shown in FIG. 6, a length of one 64/66b code block is allocated as an alignment marker in this embodiment of the present invention, and an overhead (OH) code block of a 64/66b code block is allocated at an interval of a particular length. It should be noted that lengths and locations of an alignment marker and an overhead in the present invention are only examples. Other locations and lengths may alternatively be set for an alignment marker and an overhead according to different granularities. For example, the alignment marker may have a length of 1, 2, 3, . . . , or 100 granularities, and the overhead may also have a length of 1, 2, 3, . . . , or 100 granularities. A length of each row may be set, for example, 8192 columns, half of 16384 columns, may be set as a row. Alternatively, another length may be set for a row. This is not limited in this embodiment of the present invention. Each row includes one alignment marker, and one or more subframe structures. Each subframe includes one overhead bearing area and one payload bearing area. It should be noted that the overhead bearing area in this embodiment of the present invention is optional. In fact, an overhead is not required for a fixedly configured static service. In this case, this needs to be negotiated by a transmit end and a receive end or configured by a network management system. In addition, optionally, an overhead bearing area of each row may include a corresponding check field for subsequent check. Optionally, outside an alignment marker, an overhead, and a payload bearing area, a corresponding check field may be reserved in each row, or a corresponding check field is reserved in a payload bearing area of each subframe.

At the reconciliation sublayer, after a corresponding service signal is received, the corresponding service signal is multiplexed to a corresponding payload bearing area. It may be determined, at the reconciliation sublayer according to a specific multiplexing manner and bandwidth that is required by the service signal, a size of bandwidth that is occupied by the corresponding service signal and that is in the payload bearing area or a quantity of granularities that are occupied by the corresponding service signal and that are in the payload bearing area, and a corresponding location of the service signal in the payload area. The size of bandwidth occupied by the service signal or the quantity of granularities occupied by the service signal is determined at the reconciliation sublayer according to one or more of a fixed configuration, a network management system configuration, a negotiation result, or a determined bandwidth allocation policy. The corresponding location of the service signal in the payload area may be determined directly according to a specific multiplexing technology, may be determined by using a proprietary algorithm, or may be determined by using a fixed configuration. This is not limited in this embodiment of the present invention.

Optionally, in this embodiment of the present invention, different services may be multiplexed to different Ethernet PCS lanes. For example, the first service signal is multiplexed to a first Ethernet PCS lane, the second service signal is multiplexed to a second Ethernet PCS lane, and so on.

Optionally, one Ethernet PCS lane may bear one service signal, or may be used to bear multiple service signals. One service signal may be borne on one Ethernet PCS lane, or may be borne on multiple Ethernet PCS lanes. For example, one part of one Ethernet PCS lane or the foregoing frame structure may bear a first service and the other part thereof may bear a second service. For another example, the first service signal may be borne on multiple Ethernet PCS lanes, and bandwidth of the first service signal is equal to a sum of bandwidth, occupied by the first service signal, on the corresponding multiple Ethernet PCS lanes. In this way, a service signal in this embodiment of the present invention may occupy bandwidth of any size, and a system has high flexibility.

Optionally, in this embodiment of the present invention, corresponding overhead information may also be generated according to a corresponding service, and the overhead information is borne in the foregoing overhead bearing area. Specific content of the overhead information is optional according to a specific architecture. For example, the overhead information may include one or more of the following information: a size of occupied bandwidth, a quantity of occupied granularities, a bandwidth change indication, an identifier of an Ethernet PCS lane in which the service is located, a change indication of the quantity of occupied granularities, corresponding check information, information about location distribution of the service signal in the payload bearing area, type information of the service signal, identifier information of the service signal, or change information of the service signal (such as identifier change information of the service signal and bandwidth adjustment information of the service signal). Overhead information mentioned in all the embodiments of the present invention may be combined with the foregoing information, and overhead information mentioned in different embodiments may also be combined with each other.

It should be noted that the corresponding overhead information is optional. No overhead information is required for a fixedly configured static service. In addition, a step of adding the corresponding overhead information may be performed at the reconciliation sublayer, or may be transmitted from the reconciliation sublayer to the Ethernet PHY layer, so as to be performed at a PCS layer or another layer of the PHY layer. This is not limited in this embodiment of the present invention.

At the reconciliation sublayer, a corresponding alignment marker and/or overhead bearing area may be added, or a fixed padding byte may be padded at a corresponding location of the corresponding alignment marker and/or overhead bearing area OH, or an idle character may be padded at the corresponding location of the alignment marker and/or overhead bearing area OH, so that an actual alignment marker and/or overhead bearing area OH is used at the PCS layer or another layer of the PHY layer to replace the corresponding fixed padding byte or the idle character.

It should be noted that the overhead information in the overhead bearing area may be explicit or implicit. For example, when an Ethernet PCS lane is occupied by two service signals: the first service signal and the second service signal, only the overhead bearing area is selected to bear bandwidth occupancy information or a quantity of occupied granularities of the first service signal, and remaining bandwidth or a remaining quantity of granularities is considered by default to be occupied by the second service signal. In this way, overhead information needed to be transmitted can be reduced, and bandwidth utilization is indirectly improved. Optionally, bandwidth occupancy information or quantities of occupied granularities of the first service signal and the second service signal may be explicitly borne in the overhead bearing area. In this way, reliability of overhead information transmission can be improved.

After the corresponding service signal is encapsulated, the service signal is transmitted from the reconciliation sublayer to the PCS layer or another layer of the Ethernet PHY layer, and the service signal may be the first service signal, the second service signal, and the like, and is borne in the bearing area of the Ethernet PCS lane. Alternatively, the transmitting the service signal borne in the bearing area of the Ethernet PCS lane can be understood as that a corresponding processing device transmits, to a transmission link, the service signal borne in the bearing area of the corresponding Ethernet PCS lane. In the case in which the service signal is transmitted to the PCS layer, the step of transmitting the service signal in this embodiment of the present invention includes transmitting a data stream in which the corresponding service signal is encapsulated, and transmitting the clock signal and an indication signal. The indication signal is used to indicate a location of an alignment marker AM corresponding to the at least one bearing area. That is, at the reconciliation sublayer, during a clock cycle of transmitting an alignment marker, the indication signal may also be transmitted, so as to indicate that an alignment marker is transmitted in the current clock cycle. When there is an overhead bearing area, locations of both the alignment marker and the overhead bearing area may be relatively fixed. When the location of the alignment marker is indicated, the location of the corresponding overhead bearing area is correspondingly designated. Optionally, the indication signal may also indicate whether the alignment marker, the overhead bearing area, or a payload bearing area is transmitted in the current clock cycle. For example, when the indication signal is 1, the payload bearing area is transmitted in the current clock cycle. When the indication signal is 2, the alignment marker is transmitted in the current clock cycle. When the indication signal is 3, the overhead bearing area is transmitted in the current clock cycle. The foregoing are only examples herein. The indication signal indicating the payload bearing area, the indication signal indicating the overhead bearing area, and the indication signal indicating the alignment marker may be any combination of 1 to 100, or may be any combination of indication manners of another signal.

In this embodiment of the present invention, the service identifier signal transmitted from the reconciliation sublayer to the transmit end of the first service signal and the transmit end of the second service signal may be one signal or may be a combination of multiple signals. The indication signal sent from the reconciliation sublayer to the PCS layer may be one signal or may be a combination of multiple signals. For example, an indication manner in Embodiment 1 in the following may be combined herein.

According to the communications method and a communications device that are described in the embodiments of the present invention, multiple service signals may be borne in a same bearing area of a same Ethernet PCS lane. Therefore, it is implemented that multiple types of service signals share an Ethernet channel, so that the multiple types of service signals can share a link resource and an interface module resource. This provides a basis for convergence and integration of devices in a multi-technology system, and can improve utilization of link resources and reduce a quantity, a footprint, power consumption, maintenance costs, and the like of devices in a metropolitan area network.

A method performed in a receive direction is described in the following with reference to the accompanying drawings in an embodiment of the present invention.

Figure 7:
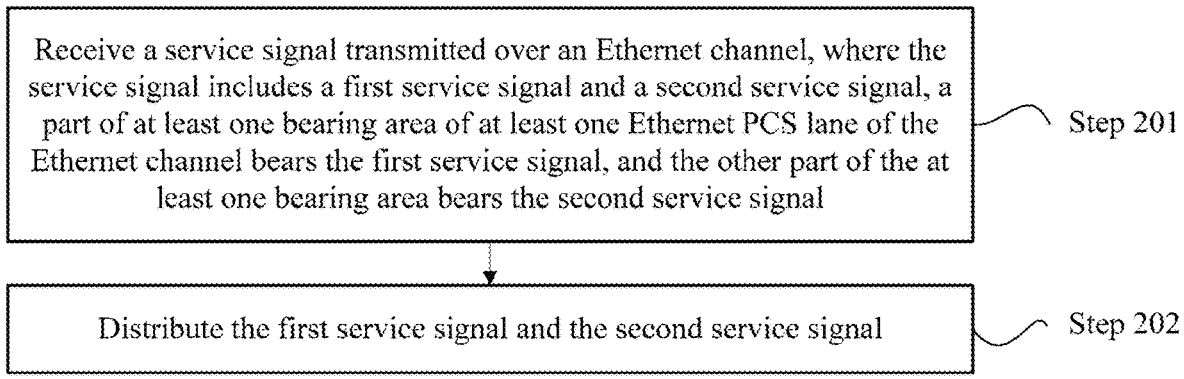
FIG. 7 is a flowchart of a method performed in a receive direction according to an embodiment of the present invention.

As shown in FIG. 7, an embodiment of the present invention provides a method for transmitting a service signal by using an Ethernet channel. The Ethernet channel includes multiple Ethernet physical coding sublayer PCS lanes, and each Ethernet PCS lane uses a bearing area with a fixed length to transmit a service signal. The method includes: receiving a service signal transmitted over the Ethernet channel, where the service signal includes a first service signal and a second service signal, one part of at least one bearing area of at least one Ethernet PCS lane of the Ethernet channel bears the first service signal, and the other part of the at least one bearing area bears the second service signal; and distributing the first service signal and the second service signal.

With reference to all the foregoing implementations, optionally, the at least one bearing area includes an overhead bearing area and a payload bearing area. The overhead bearing area bears bandwidth indication information. The bandwidth indication information is used to indicate bandwidth, occupied by the first service signal, in the payload bearing area. The distributing the first service signal and the second service signal includes: obtaining the bandwidth indication information in the overhead bearing area; generating a service identifier signal according to an identifier of the first service signal and an identifier of the second service signal that are locally stored and the bandwidth indication information; and transmitting a clock signal, the service identifier signal, and the at least one bearing area. The service identifier signal is used to indicate locations, occupied by the first service signal and the second service signal, in the payload bearing area. Further, optionally, the bandwidth indication information in the overhead bearing area is bandwidth granularity quantity information. The bandwidth granularity quantity information is used to indicate a quantity of bandwidth granularities, occupied by the first service signal, in the payload bearing area, and each bandwidth granularity has a fixed length.

With reference to all the foregoing implementations, optionally, the first service signal is an Ethernet service signal, a synchronous digital hierarchy (SDH) service signal, an optical transport network (OTN) service signal, or a common public radio interface (CPRI) service signal. The second service signal is an Ethernet service signal.

With reference to all the foregoing implementations, optionally, the method further includes receiving a clock signal and an indication signal. The indication signal is used to indicate a location of the overhead bearing area.

In a receive direction, after a service signal is received at a PHY layer, the service signal is transmitted to a reconciliation sublayer, and then the signal is transmitted from the reconciliation sublayer to an upper layer. There are multiple methods for transmitting data from the PHY layer to the reconciliation sublayer in the prior art. All the methods may be used in this embodiment of the present invention, and details thereof are not described in the present invention. Only a transmission manner different from that in the prior art is described in this embodiment of the present invention. In this embodiment of the present invention, when a service signal is transmitted from the PHY layer, for example, a PCS layer of the PHY layer, to the reconciliation sublayer, an alignment marker is optional, that is, an alignment marker may not be transmitted. For a statically configured service, the overhead bearing area is optional and corresponding overhead information is also optional. When the service signal is transmitted from the PSC layer to the reconciliation sublayer, a clock signal and an indication signal are further transmitted. The indication signal is used to specifically indicate whether a payload bearing area, an overhead bearing area (if existent), or an alignment marker (if existent) is transmitted in each clock cycle.

A corresponding signal is received at the reconciliation sublayer from each Ethernet PCS lane. For example, signals from different Ethernet PCS lanes may be identified at the reconciliation sublayer by using an alignment marker transmitted from the PCS. Alternatively, a corresponding overhead bearing area may bear an identifier of a corresponding Ethernet PCS lane, and the corresponding Ethernet PCS lane may be identified at the reconciliation sublayer according to the identifier of the Ethernet PCS lane in the overhead bearing area.

After a signal borne in a corresponding Ethernet PCS lane is received at the reconciliation sublayer, bandwidth indication information in an overhead bearing area or locally stored bandwidth allocation information are obtained at the reconciliation sublayer, and a bearing location of the corresponding service signal in a payload bearing area is determined according to the bandwidth indication information or the bandwidth allocation information. For example, when the corresponding payload bearing area bears the first service signal and the second service signal, a service identifier signal is generated at the reconciliation sublayer by using a determined bearing location of each service signal and a locally stored identifier of a corresponding service signal. Then, when a signal received at the reconciliation sublayer from a corresponding Ethernet PCS lane is broadcast from the reconciliation sublayer to a corresponding receive end of a first service and a corresponding receive end of a second service, a corresponding clock signal and a corresponding service identifier signal are transmitted. A corresponding receive end receives a service whose identifier matching an identifier of the receive end, where the identifier of the service is indicated by a service identifier signal.

The method performed in a transmit direction and the method performed in a receive direction in this embodiment of the present invention is complementary to each other, principles thereof are the same, and corresponding technical details may be combined with each other without limitation.

With reference to the foregoing method embodiments, the embodiments of the present invention further provide a corresponding communications device. It can be understood by a person skilled in the art that the communications device described in the embodiments of the present invention is configured to execute the method provided in the embodiments of the present invention, and the method described in the embodiments of the present invention may be executed by the communications device provided in the embodiments of the present invention. The communications device and the method are complementary to each other, and the descriptions in the method embodiments are also applicable to the communications device, and descriptions of the communications device are also applicable to a corresponding method. Technical means in a corresponding method embodiment may be used by the communications device, and technical means in a corresponding device embodiment may be incorporated into a corresponding method.

Figure 8:
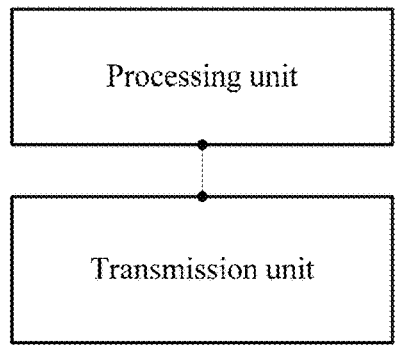
FIG. 8 is a schematic diagram of a communications device used in a transmit direction according to an embodiment of the present invention.

As shown in FIG. 8, an embodiment of the present invention provides a communications device. The communications device includes: a processing unit, configured to: receive a first service signal and a second service signal, and multiplex the first service signal and the second service signal to a bearing area of an Ethernet PCS lane, where one part of at least one bearing area of at least one Ethernet PCS lane of the Ethernet channel bears the first service signal, and the other part of the at least one bearing area bears the second service signal; and a transmission unit, configured to transmit the first service signal and the second service signal that are borne in the bearing area of the Ethernet PCS lane.

With reference to all the foregoing implementations, optionally, the at least one bearing area includes an overhead bearing area and a payload bearing area. The overhead bearing area bears bandwidth indication information. The bandwidth indication information is used to indicate bandwidth, occupied by the first service signal, in the payload bearing area.

With reference to all the foregoing implementations, optionally, the bandwidth indication information is bandwidth granularity quantity information. The bandwidth granularity quantity information is used to indicate a quantity of bandwidth granularities, occupied by the first service signal, in the payload bearing area, and each bandwidth granularity has a fixed length.

With reference to all the foregoing implementations, optionally, the first service signal is an Ethernet service signal, a synchronous digital hierarchy (SDH) service signal, an optical transport network (OTN) service signal, or a common public radio interface (CPRI) service signal. The second service signal is an Ethernet service signal.

With reference to all the foregoing implementations, optionally, the receiving a first service signal and a second service signal includes: transmitting a service identifier signal and a clock signal to a transmit end of the first service signal and a transmit end of the second service signal, and receiving the first service signal transmitted by the transmit end of the first service signal and the second service signal transmitted by the transmit end of the second service signal. When the service identifier signal is a first identifier, the transmit end of the first service signal transmits the first service signal, and the transmit end of the second service signal skips transmitting a service signal. When the service identifier signal is a second identifier, the transmit end of the second service signal transmits the second service signal, and the transmit end of the first service signal skips transmitting a service signal. The first identifier is corresponding to the first service signal, and the second identifier is corresponding to the second service signal.

With reference to all the foregoing implementations, optionally, the transmitting the first service signal and the second service signal that are borne in the bearing area of the Ethernet PCS lane includes: transmitting the at least one bearing area of the at least one Ethernet PCS lane, and transmitting the clock signal and an indication signal. The indication signal is used to indicate a location of an alignment marker AM corresponding to the at least one bearing area. Further, optionally, the indication signal is further used to indicate a location of the overhead bearing area of the at least one bearing area and a location of the payload bearing area of the at least one bearing area.

In this embodiment of the present invention, all methods and steps other than the transmitting step may be implemented in the processing unit, and the corresponding processing unit may be configured to implement steps other than the transmitting step in the foregoing method embodiments.

Specifically, the corresponding processing unit may be an application-specific integrated circuit (ASIC), a field-programmable gate array (FPGA), a central processing unit (CPU), or another device, or may be a combination of two or more ASICs, FPGAs, CPUs, or other devices. The corresponding ASIC, FPGA, CPU, and another device include a series of executable instructions. When these instructions are executed, the corresponding ASIC, FPGA or CPU is triggered to perform a corresponding function, that is, to execute a corresponding method. The corresponding instructions may be stored in a storage medium or built into the corresponding ASIC or FPGA.

Specifically, the corresponding transmission unit may refer to an interface, having a function of transmitting a signal stream, connected to the processing unit, or may refer to a function module integrating a PMA, a PMD, and a transmitter. Optionally, the corresponding transmission unit may further include an FEC functional module. Corresponding PMA, PMD and FEC functions may be integrated into one or more ASICs, FPGAs, or CPUs.

Figure 9:
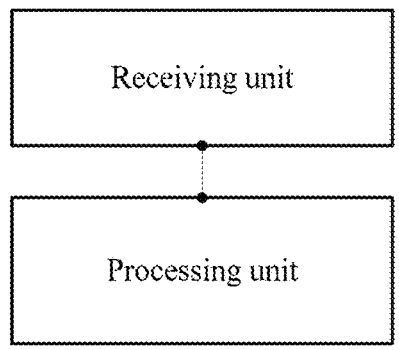
FIG. 9 is a schematic diagram of a communications device used in a receive direction according to an embodiment of the present invention.

As shown in FIG. 9, an embodiment of the present invention provides a communications device. The communications device includes: a receiving unit, configured to receive a service signal transmitted over the Ethernet channel, where the service signal includes a first service signal and a second service signal, one part of at least one bearing area of at least one Ethernet PCS lane of the Ethernet channel bears the first service signal, and the other part of the at least one bearing area bears the second service signal; and a processing unit, configured to distribute the first service signal and the second service signal.

With reference to all the foregoing implementations, optionally, the at least one bearing area includes an overhead bearing area and a payload bearing area. The overhead bearing area bears bandwidth indication information. The bandwidth indication information is used to indicate bandwidth, occupied by the first service signal, in the payload bearing area. The distributing the first service signal and the second service signal includes: obtaining the bandwidth indication information in the overhead bearing area; generating a service identifier signal according to an identifier of the first service signal and an identifier of the second service signal that are locally stored and the bandwidth indication information; and transmitting a clock signal, the service identifier signal, and the at least one bearing area. The service identifier signal is used to indicate locations, occupied by the first service signal and the second service signal, in the payload bearing area.

With reference to all the foregoing implementations, optionally, the bandwidth indication information is bandwidth granularity quantity information. The bandwidth granularity quantity information is used to indicate a quantity of bandwidth granularities, occupied by the first service signal, in the payload bearing area, and each bandwidth granularity has a fixed length.

With reference to all the foregoing implementations, optionally, the first service signal is an Ethernet service signal, a synchronous digital hierarchy (SDH) service signal, an optical transport network (OTN) service signal, or a common public radio interface (CPRI) service signal. The second service signal is an Ethernet service signal.

With reference to all the foregoing implementations, optionally, the receiving unit is further configured to receive a clock signal and an indication signal. The processing unit is further configured to determine a location of the overhead bearing area according to the indication signal.

In this embodiment of the present invention, all methods and steps other than the receiving step may be implemented in the processing unit, and the corresponding processing unit may be configured to implement steps other than the receiving step in the foregoing method embodiments.

Specifically, the corresponding processing unit may be an ASIC, an FPGA, a CPU, or another device, or may be a combination of two or more ASICs, FPGAs, CPUs, or other devices. The corresponding ASIC, FPGA, CPU, and another device include a series of executable instructions. When these instructions are executed, the corresponding ASIC, FPGA or CPU is triggered to perform a corresponding function, that is, to execute a corresponding method. The corresponding instructions may be stored in a storage medium or built into the corresponding ASIC or FPGA.

Specifically, the corresponding receiving unit may refer to an interface, having a function of receiving a signal stream, connected to the processing unit, or may refer to a function module integrating a PMA, a PMD, and a receiver. Optionally, the corresponding receiving unit may further include an FEC functional module. Corresponding PMA, PMD and FEC functions may be integrated into one or more ASICs, FPGAs, or CPUs.

Specific embodiments of the present invention are described in detail in the following with reference to specific scenarios.

Embodiment 1

This embodiment of the present invention is described in detail in the following with reference to the accompanying drawings.

An Ethernet physical interface of a 100GE is divided into 20 physical coding sublayer logical lanes (PCS Lane). Each logical lane periodically includes an alignment marker (AM) every 16384 64/66b code blocks. The alignment marker is used for synchronization and alignment of all parallel physical coding sublayer logical lanes to recover a single 100GE data stream. Therefore, a physical layer of the interface of the 100GE has a typical 20-row 16384-column periodical data frame structure. This 20-row 16384-column periodical data frame structure is equivalent to having 20 timeslots.

A case in a 40GE is similar. There are four physical coding sublayer logical lanes (PCS Lane). A physical layer of an interface of the 40GE has a typical 4-row 16384-column periodical data frame structure, and is equivalent to having four timeslots.

For a frame structure of 20-row 16384-column 64/66b code blocks of a multi-physical coding sublayer logical lane (PCS Lane) of the 100GE, and a frame structure of 4-row 16384-column 64/66b code blocks of a multi-physical coding sublayer logical lane (PCS Lane) of the 40GE, a multiplexed frame, with a length of 16384 columns, of each lane, may be further divided into several multiplexed subframes and an overhead is defined for the subframe. For example, it is defined in FIG. 10 that 16383 blocks except a synchronization and alignment code block (Alignment Marker: AM) in a multiplexed frame of each logical lane are further equally divided into three multiplexed subframes. The first 64/66b code block (including a total of 66 bits: 8 bytes+2 bits of synchronization header) of each subframe is defined as an overhead bearing area of the subframe. The rest is a multiplexing bearing area, and includes 5460 64/66b code blocks. Each 64/66b code block or an 8-character byte, before coding, corresponding to the code block is used as an allocatable bandwidth granularity. Similarly, the physical layer interface of the 40GE has four physical coding sublayer logical lanes, and a multiplexed frame, with a length of 16384 blocks, of each lane may be divided into 3 multiplexed subframes.

A case of hybrid multiplexing of a CPRI-20 in a 40GE Ethernet link is described in detail in the following.

Bit multiplexing timeslots are already obtained by means of division in the 40GE interface and the 100GE interface. In the present invention, bandwidth in some timeslots is allocated as required and is used to multiplex CPRI interface data. The remaining bandwidth is all used for transmission of original Ethernet statistical multiplexing packet data.

In an Ethernet packet service, a data packet statistically multiplexes a link resource, and effective traffic fluctuates. System design and network deployment are generally implemented based on a peak demand. When effective traffic is low, transmission of ineffective idle bytes and padding bytes over a link results in a waste of resources. For example, when a 40GE has only 60% effective traffic, 40% of bandwidth of the 40GE is actually idle and wasted. This embodiment provides description about a case in which data of a CPRIx20 circuit interface with a constant bit rate (CBR) and packet data of the Ethernet with only 60% effective traffic share and multiplex one physical interface and link of the 40GE.

The following table shows nominal clocks and interface information rates of a 40GE physical interface and a CPRIx20 physical interface, and extreme rates of the 40GE physical interface and the CPRIx20 physical interface in a case of ±100 ppm frequency offset.

TABLE 2

|  | Typical nominal rate (−100 ppm) | Typical nominal rate | Typical nominal rate (+100 ppm) |
|---|---|---|---|
| CPRIx1 | 0.49152 * 66/64 * (1 − 0.0001) = 0.506829312G | 0.49152 * 66/64 = 0.50688G | 0.49152 * 66/64 * (1 + 0.0001) 0.506930688G |
| CPRIx5 | 0.49152 * 66/64 * (1 − 0.0001) * 5 = 2.53414656G | 0.49152 * 66/64 * 5 = 2.5344G | 0.49152 * 66/64 * (1 + 0.0001) * 5 = 2.53465344G |
| CPRIx10 | 0.49152 * 66/64 * (1 − 0.0001) * 10 = 5.06829312G | 0.49152 * 66/64 * 10 = 5.0688G | 0.49152 * 66/64 * (1 + 0.0001) * 10 = 5.06930688G |
| CPRIx20 | 0.49152 * 66/64 * (1 − 0.0001) * 20 = 10.13658624G | 0.49152 * 66/64 * 20 = 10.1376G | 0.49152 * 66/64 * (1 + 0.0001) * 20 = 10.13861376G |
| 10GE | 10 * 66/64 * (1 − 0.0001) = 10.31146875G | 10 * 66/64 = 10.3125G | 10 * 66/64 * (1 + 0.0001) = 10.31353125G |
| 40GE |  | 40 * 66/64 = 41.25G |  |
| 40GE/4 lane | 40/4 * 66/64 * (1 − 0.0001) = 10.31146875G | 40/4 * 66/64 = 10.3125G | 40/4 * 66/64 * (1 + 0.0001) = 10.31353125G |
| 100GE | 100 * 66/64 * (1 − 0.0001) = 103.1146875G | 100 * 66/64 = 103.125G | 100 * 66/64 * (1 + 0.0001) = 103.1353125G |
| 100GE/20 Lane | 100/20 * 66/64 * (1 − 0.0001) 5.155734375G | 100/20 * 66/64 = 5.15625G | 100/20 * 66/64 * (1 + 0.0001) 5.156765625G |

For ease of description, it is assumed that both the physical interface of the 40GE Ethernet with 60% effective traffic and the CPRIx20 circuit interface with a constant bit rate work at nominal clock frequencies, and have nominal interface information rates. In this embodiment, data of the CPRIx20 circuit interface with a nominal constant bit rate (CBR) is multiplexed to the first physical coding sublayer logical lane (Lane 0) of the 40GE physical interface with a nominal rate. That is, in the present invention, some bandwidth resources (¼=25%) on the logical lane are allocated to an interface of another technical system as required after being obtained from link bandwidth of an Ethernet interface by means of division, so as to implement sharing and multiplexing of an interface and link resources.

Bandwidth resources are allocated according to a 64/66b block. A frame synchronization header of a CPRI-20 originally has 20 0x50 bytes. To cooperate with use of 64/66b coding, an adaptation sublayer of the CPRI-20 uses an end of frame character /T/=0xFD and a start of frame character /S/=0xFB to respectively replace the eighth byte and the ninth byte (#Z.0.7 and #Z.0.8) of the synchronization header of 20 0x50 bytes of the CPRI-20, uses TXC=1 as a control character for an MII interface, and makes the character /S/ appear in the first byte of an 8-byte granularity or a 64/66b code block. In this embodiment, to ensure compatibility with 64/66b, the character /S/ also needs to appear in the first byte of an 8-byte granularity or a 64/66b code block.

A nominal frame frequency of a subframe of a multiplexed frame is $Fc=(100*10^9)/64/20/16384*3=28610.2294921875$ frames/second, and a quantity of bandwidth granularities of the subframe is 5460 (64/66b blocks). For a nominal rate of a CPRIx20, $(0.49152*10^9)/64*20/Fc=5368.70912$ bandwidth granularities need to be allocated in each multiplexed subframe. Therefore, 5369 bandwidth granularities or 64/66b blocks are allocated in each of 70912 subframes of 100000 subframes, and 5368 bandwidth granularities or 64/66b blocks are allocated in each of 100000−70912=29088 subframes. In this way, an average quantity of allocated bandwidth granularities or 64/66b blocks can be approximately 5368.70912. To be as evenly as possible, because 70912:29088=2.437843784378438:1, one subframe in which 5368 bandwidth granularities are allocated exists approximately every two or three subframes in which 5369 bandwidth granularities are allocated, so that a buffering need is reduced. Interleaving and arrangement of subframes may be determined by using an algorithm. For example, a quantity of bandwidth granularities allocated in each of the first 50 subframes and interleaving and arrangement of the subframes may be determined in the following manner.

TABLE 3

Algorithm 1:

target=(0.49152*10^9)/64*20/((40*10^9)/64/4/16384*3);   % an average quantity of bandwidth granularities that need to be allocated in each subframe in this embodiment
accumulated=0;
len=50; % a quantity of bandwidth granularities allocated in each of 50 subframes shown in the following figure in this embodiment
for i=1:len
 accumulated=accumulated+target;     % update an accumulated quantity of bandwidth granularities that need to be allocated
  Cn_subframe (i)=floor(accumulated);      % determine a quantity of bandwidth granularities allocated in a current subframe, and round a current accumulated quantity
  accumulated=accumulated−Cn_subframe (i)     % update the accumulated quantity of bandwidth granularities that need to be allocated
end A specific arrangement sequence is as follows: [ . . . 5368, 5369, 5369, 5368, 5369, 5369, 5369, 5368 . . . ]. Such arrangement can reduce the buffering need, and theoretically, an effective accumulation depth for data buffering can be controlled below 1. A same result may be obtained by using the following algorithm 2.

TABLE 4

Algorithm 2:

target=(0.49152*10^9)/64*20/((40*10^9)/64/4/16384*3);   % an average quantity of bandwidth granularities that need to be allocated in each subframe in this embodiment
accumulated=0;
len=50; % a quantity of bandwidth granularities allocated in each of 50 subframes shown in the following figure in this embodiment
for i=1:len
 accumulated=accumulated+target;     % an accumulated quantity of bandwidth granularities that need to be allocated
  if accumulated>=ceil(target)
   Cn_subframe (i)=ceil(target);      % determine a quantity of bandwidth granularities allocated in a current subframe, and round a current accumulated quantity
   accumulated=accumulated−ceil(target)     % update the accumulated quantity of bandwidth granularities that need to be allocated
  else
   Cn_subframe (i)=floor(target);      % determine a quantity of bandwidth granularities allocated in a current subframe, and round a current accumulated quantity
   accumulated=accumulated−floor(target)     % update the accumulated quantity of bandwidth granularities that need to be allocated
  end
end As the first key point, the foregoing resolves a quantity of bandwidth granularities allocated in a subframe and an arrangement sequence thereof. The second step is to resolve a problem of allocation and arrangement of bandwidth granularities in a subframe, to determine whether a granularity is allocated to a CPRIx10 interface circuit service or is still reserved for an Ethernet statistical multiplexing packet service, so that the Ethernet statistical multiplexing packet service can use all remaining link bandwidth resources.

The second key point is as follows: because 5369:(5460−5369)=5369:91=59:1, 5460=91*60, and 5369=91*59, for a subframe in which 5369 bandwidth granularities need to be allocated, the subframe is equally divided into 91 equal parts of 60 granularities exactly, with 59 granularities of every 60 granularities being allocated to the CPRIx20, and the remaining one granularity being reserved for the Ethernet statistical multiplexing packet service. In addition, because 5368:(5460−5368)=5368:92=58.3478:1, 5460=60*59+32*60, 5368=60*58+32*59, and 60:32=15:8, for a subframe in which 5368 bandwidth granularities need to be allocated, the subframe may be divided into 60 parts of 59 granularities and 32 parts of 60 granularities, with one bandwidth granularity of each part still being reserved for the Ethernet statistical multiplexing packet service, and the remaining 58 or 59 granularities being allocated to the CPRIx20.

The allocation and designation or belonging of bandwidth granularities in subframes may be determined in the following manner. A quantity of allocatable 64/66b granularities in a subframe is set to $Pc\_subframe$, and a quantity of 64/66b granularities that need to be allocated to the circuit service in a current subframe is allowed to be $Cn\_subframe$. Allocation and arrangement of 64/66b granularities marked as 1 to $Pc\_subframe$ in the subframes may be determined in the following manner: if the $j^{th}$ granularity satisfies $mod(j*Cn\_subframe, Pc\_subframe)<Cn\_subframe$, the $j^{th}$ granularity is a bandwidth granularity to be allocated to a TDM service. Otherwise, the $j^{th}$ granularity is reserved for the Ethernet statistical multiplexing packet service. In this way, a problem of link resource sharing and multiplexing of two types of services is resolved.

TABLE 5

```
for j=1: Pc_subframe
    if mod(j*Cn_subframe, Pc_subframe)<Cn_subframe
        Occupied(j)=true;
    else Occupied(j)=false;
    end;
end
```

In this embodiment, 5368 or 5369 bandwidth granularities of a subframe of the foregoing subframes (there are 5460 granularities each) need to be allocated at an interval. At a receive end, a receiver only needs to learn a value of $Cn\_subframe$ in advance, and may also determine allocation and belonging of each bandwidth granularity by using a same algorithm rule. In particular, in practice, because of clock skew and clock jitter or other reasons, for example, adjusting a rate of a circuit interface by changing a CPRIx20 to a CPRIx10, there may be an accompanying slow or rapid change of $Cn\_subframe$. Therefore, a transmit end needs and only needs to transmit in real time a value of $Cn\_subframe$ corresponding to a subframe to the receive end.

Figure 11:
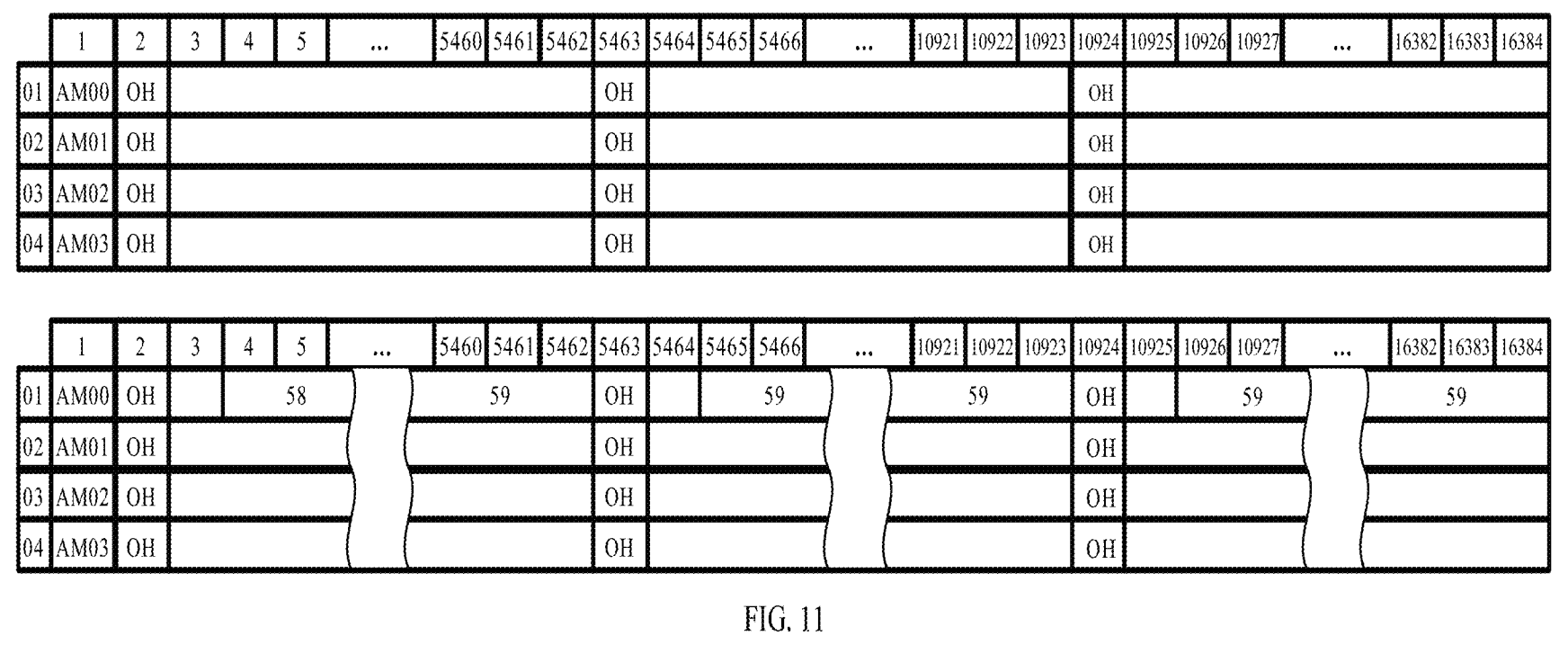

All bandwidth granularities, reserved for an Ethernet service, of each physical coding sublayer lane of a 100GE are used for multiplexing of the Ethernet service. As shown in FIG. 11, on a first lane, 5368 granularities are allocated in a first subframe, and one reserved bandwidth granularity is allocated every 58 or 59 allocated bandwidth granularities; 5369 granularities are allocated in both a second subframe and a third subframe, and one reserved bandwidth granularity is allocated every 59 allocated bandwidth granularities.

Figure 12:
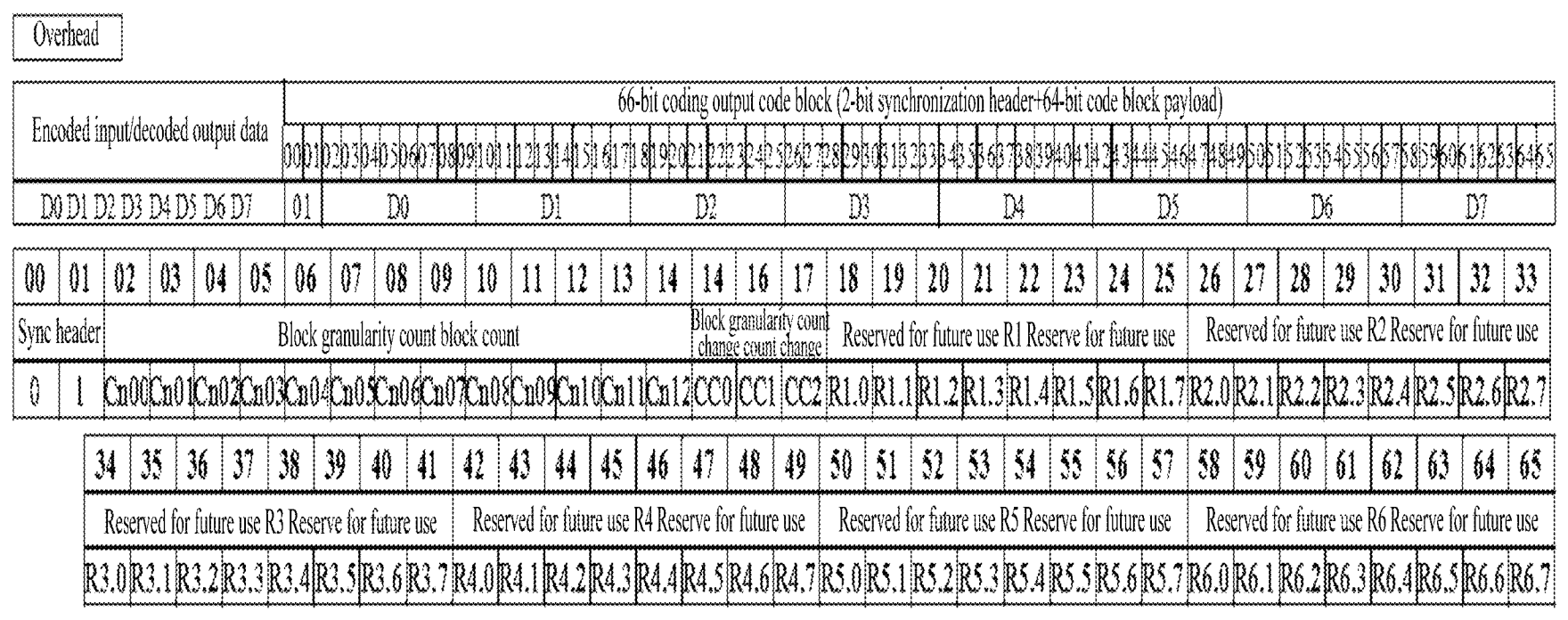

The third key point is as follows: a communication mechanism also needs to be provided at both ends of a physical link, where the communication mechanism is used by a transmit end of the physical link to indicate, to a receive end, allocation of the bandwidth granularities, so as to implement reliable transmission of the bandwidth granularity allocation quantity $Cn\_subframe$ of each subframe from the transmit end to the receive end. The first 64/66b code block of each subframe of an improved high-speed Ethernet physical interface in the present invention is an overhead block. As shown in FIG. 12, the overhead block may be used as a special data block, a synchronization header is a two-bit data-block synchronization header "0b01", some of 8 bytes of the overhead block are used for transmission of $Cn\_subframe$ of each subframe from a transmit end of a link to a receive end of the link.

As shown in FIG. 12, there are 5460 allocatable bandwidth granularities in each subframe, and a 13-bit $Cn\_subframe$ indication ($2^{12}=4096$, $2^{13}=8192$) is required. A block count field in the figure may be used to bear the $Cn\_subframe$ indication, and Table 6 shows a specific meaning of the $Cn\_subframe$ indication. $Cn\_subframe$ has two meanings, one is to indicate a quantity of allocated bandwidth granularities, and the other is to implicitly indicate a quantity of reserved bandwidth granularities. When a value of $Cn\_subframe$ is zero, it indicates that all bandwidth granularities in a current subframe are reserved.

TABLE 6

| $Cn\_subframe$ decimal value | Bandwidth granularities allocated in the subframe (bear an expected frontend service) | Bandwidth granularities reserved in the subframe (bear an expected backend service) | $Cn\_subframe$ binary value Cn13 Cn12...Cn01 Cn00 |
|---|---|---|---|
| 0 | 0 | 5460 | 0b 0000000000000 |
| 1 | 1 | 5459 | 0b 0000000000001 |
| ... | ... | ... | ... |
| 5460 | 5460 | 0 | 0b 1010101010100 |
| 5461 | Reserved (not legitimate) | Reserved (not legitimate) | 0b 1010101010101 |
| ... | ... | ... | |
| 8191 | Reserved (not legitimate) | Reserved (not legitimate) | 0b 1111111111111 |

In addition to an absolute indication of the value of Cn_subframe, a relative indication thereof may be further provided, that is, a relative change between the value of Cn_subframe of the subframe and that of a previous subframe. Specific meanings of a Cn_subframe change are shown in Table 7 below.

TABLE 7

| Cn_subframe change binary value | | Cn_subframe change | | |
|---|---|---|---|---|
| CC2 CC1 CC0 | Meaning | CC2 | CC1 | CC0 |
| 0b 000 | Cn is the same as that of the previous subframe | 0 | 0 | 0 |
| 0b 001 | Cn is 1 greater than that of the previous subframe | 0 | 0 | 1 |
| 0b 010 | Cn is 2 greater than that of the previous subframe | 0 | 1 | 0 |
| 0b 011 | Cn is 3 greater than that of the previous subframe | 0 | 1 | 1 |
| 0b 100 | The change between Cn and that of the previous subframe exceeds +/−3 | 1 | 0 | 0 |
| 0b 101 | Cn is 1 less than that of the previous subframe | 1 | 0 | 1 |
| 0b 110 | Cn is 2 less than that of the previous subframe | 1 | 1 | 0 |
| 0b 111 | Cn is 3 less than that of the previous subframe | 1 | 1 | 1 |

The indication of the relative change may also be used to confirm and check whether Cn_subframe is reliably transmitted and plays a check role. Generally, the relative change is +1 and −1.

Figure 13:
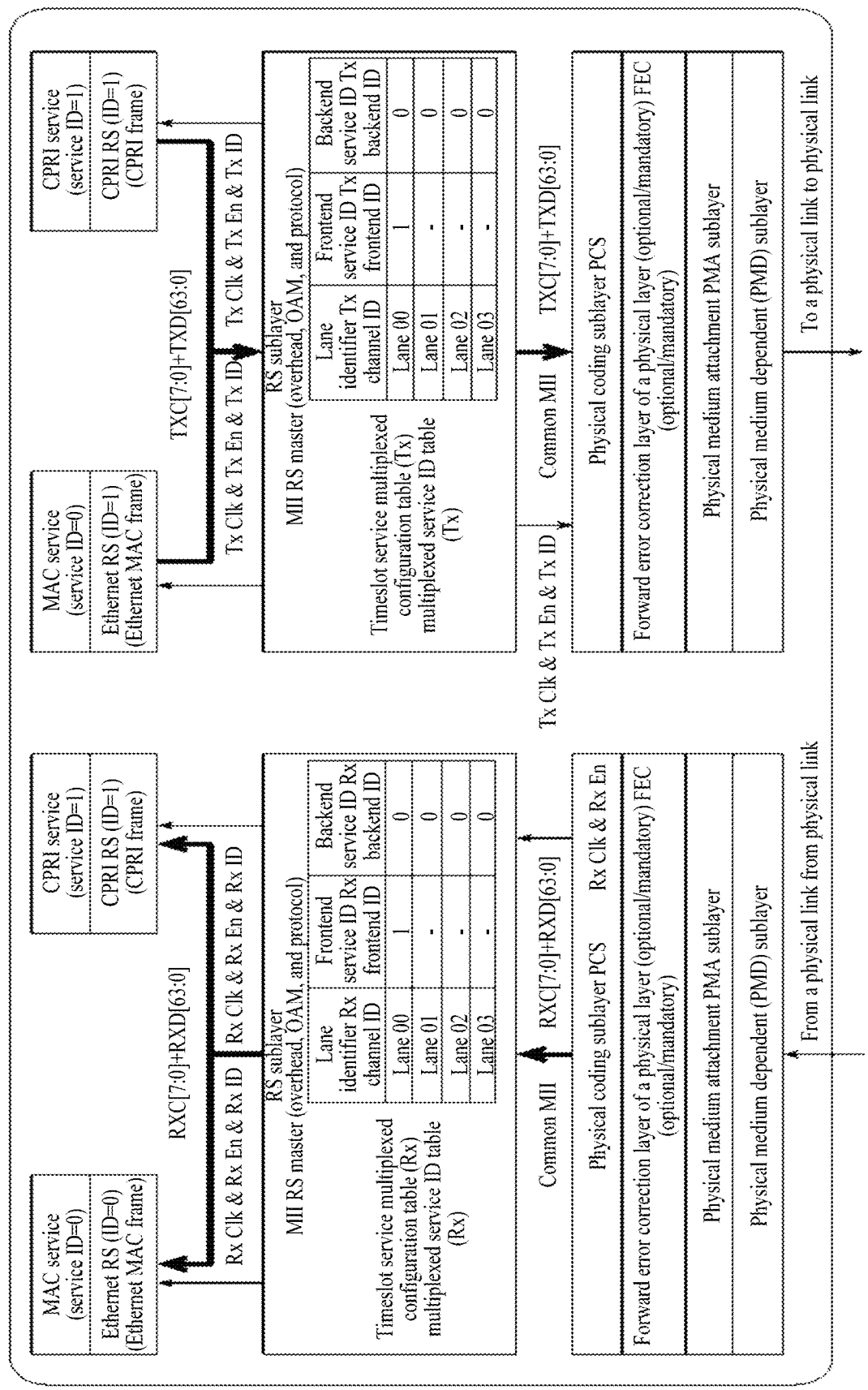
FIG. 13 is a diagram of a system architecture in an implementation according to Embodiment 1 of the present invention.

As shown in FIG. 13, a service identifier ID assigned to a CPRI-20 may be ID=1, and a service identifier ID of a global Ethernet statistical multiplexing packet service may be ID=0. Both an MII reconciliation sublayer master module of a transmit end and an MII reconciliation sublayer master module of a receive end learn types and the identifiers IDs of the two services, and store the types and the identifiers IDs in a table form or in another form for query. The CPRI-20 service is transmitted over an allocated bandwidth granularity, and is referred to as a frontend service. The original Ethernet statistical multiplexing packet service is transmitted over a reserved bandwidth granularity, and is referred to as a backend service. A table records distribution of frontend and backend services on each lane. The MII reconciliation sublayer master modules of the transmit end and the receive end control data transmission and reception according to the table.

Figure 14:
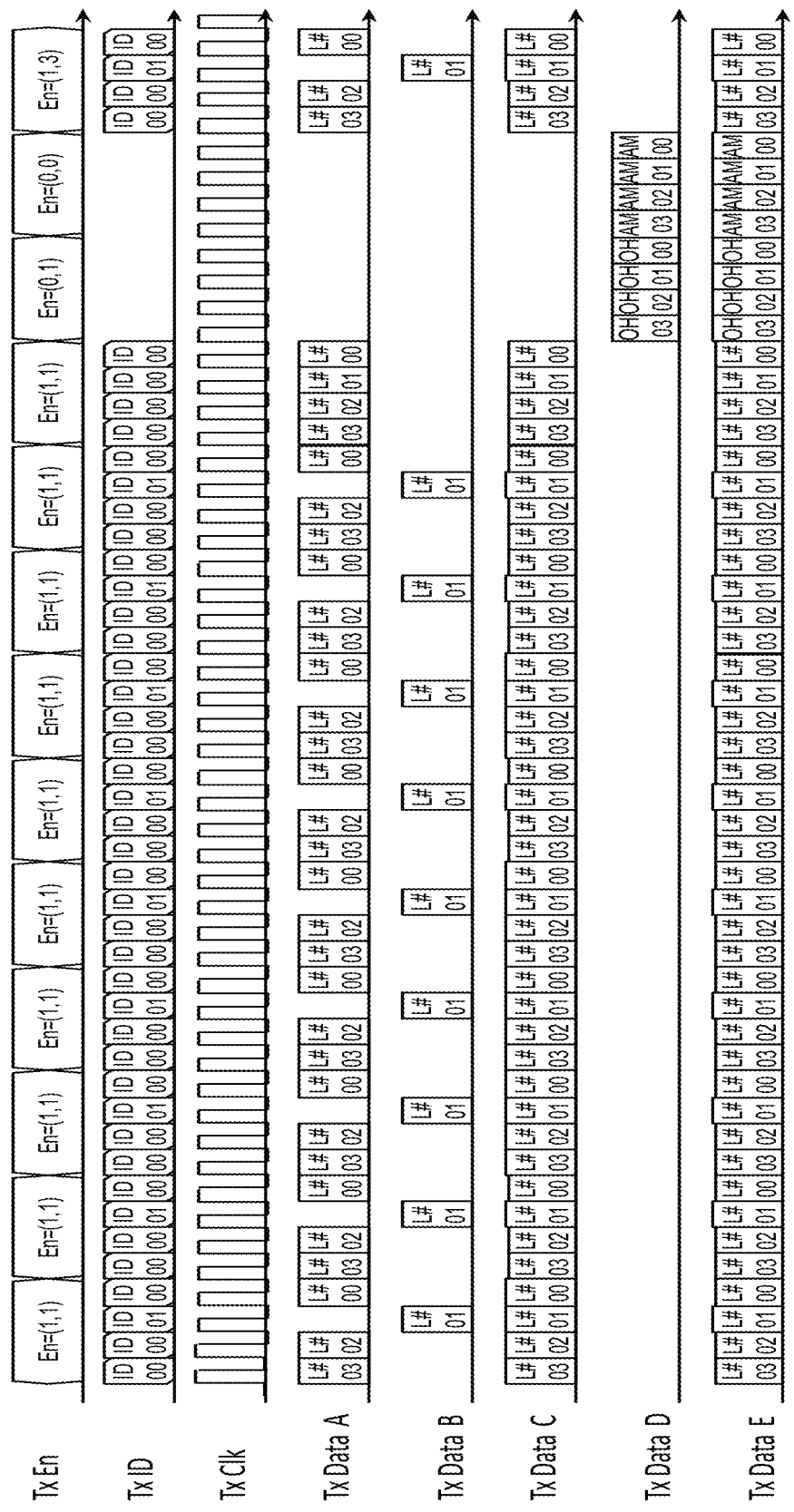
FIG. 14 is a schematic diagram of receiving a signal at a reconciliation sublayer (RS) according to Embodiment 1 of the present invention.

As shown in FIG. 14, on a transmit side, driven by a transmit clock <Tx Clk>, the MII reconciliation sublayer master module of the transmit end generates control indication signals <Tx En> and <Tx ID> according to content of the table and a multiplexed frame period. <Tx Clk>, <Tx En>, and <Tx ID> together are used to control and indicate data transmission at an Ethernet adaptation sublayer (Ethernet reconciliation sublayer, ID=0) and a CPRI adaptation sublayer (CPRI reconciliation sublayer, ID=1), and processing, such as and data coding and scrambling at a physical coding sublayer. <Tx En>=(0, 0), (0, 1), (0,2), and (0,3) respectively indicate that bandwidth granularities corresponding to a current clock cycle are synchronization alignment code blocks AM0 to AMn, first-subframe overheads OH0 to OHn, second-subframe overheads OH0 to OHn, and third-subframe overheads OH0 to OHn of lanes 0 to n. In these cases, <Tx ID> has no indication meaning, and a service cannot be transmitted. In this embodiment, the 40GE has four lanes (lane), and n=4. <Tx En>=(1, 1) indicates that n current bandwidth granularities belong to the first subframe, <Tx En>=(1, 2) indicates that n current bandwidth granularities belong to the second subframe, and <Tx En>=(1, 3) indicates that n current bandwidth granularities belong to the third subframe. Bandwidth granularity data of lanes (Lane) is arranged and transmitted in a sequence of Lane_0 to Lane_n. <Tx ID> indicates allocation and belonging of bandwidth granularities of a current data block. A specific value of <Tx ID> is determined according to a lane on which the current data block exists and Cn_subframe of a subframe in which the current data block exists, and indicates a front end service ID or a backend service configured for the lane, that is, indicates belonging of bandwidth granularities during the clock cycle. In this embodiment, when <Tx ID>=0, it indicates that a bandwidth granularity is an Ethernet bandwidth granularity, and data is transmitted at the Ethernet adaptation sublayer (Ethernet reconciliation sublayer, ID=0) according to an instruction, for example, the transmitted data is <Tx Data A>. When <Tx ID>=1, it indicates that a bandwidth granularity is an Ethernet bandwidth granularity, and data is transmitted at a CPRI adaptation sublayer (CPRI reconciliation sublayer, ID=1) according to an instruction, for example, the transmitted data is <Tx Data B>. <Tx Data C> is a time division multiplexing combination of the data <Tx Data A> and <Tx Data B>. Data block sequences: synchronization alignment code blocks AM0 to AMn, first-subframe overheads OH0 to OHn, second-subframe overheads OH0 to OHn, third-subframe overheads OH0 to OHn that are padded by an MII reconciliation sublayer master module of the transmit end and that are on lanes 0 to n, such as <Tx Data D>, and <Tx Data C> are combined into <Tx Data E> in a time division manner, and are transmitted to the physical layer for processing and sent to a physical link for transmission. In En=(1, 3), 1 indicates data, and 3 means the third subframe. Optionally, in one implementation, referring to FIG. 14, in En=(0,0), the first 0 indicates non-data, and the second 0 means AM/OH in the first subframe; in En=(0, 1), the first 0 indicates non-data, and 1 means overhead in the second subframe; in En=(0,2), the first 0 indicates non-data, and 2 means overhead in the third subframe.

Figure 15:
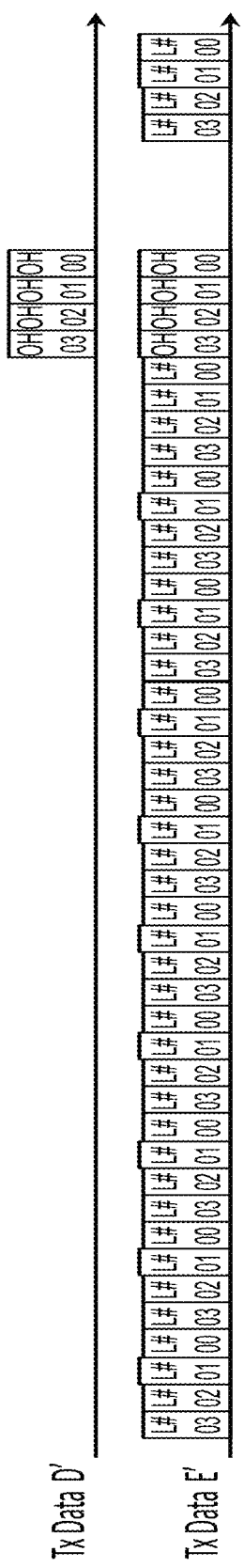
FIG. 15 is a schematic structural diagram of a signal sent at a reconciliation sublayer according to Embodiment 1 of the present invention.

<Tx En> and location indications of the synchronization alignment code blocks AM0 to AMn of the lanes 0 to n have a same meaning. Optionally, <Tx Data D> and <Tx Data E> may not include meaningful AM0 to AMn data information, such as <Tx Data D'> and <Tx Data E'> that are shown in FIG. 15. At the PCS, corresponding AM0 to AMn 64/66b code blocks may be directly inserted at a location of <Tx En>=(0,0) according to an indication of <Tx En>.

Scrambling processing at the PCS is performed only on a code block other than the AM0 to AMn code blocks according to the indication of <Tx En>.

Figure 16:
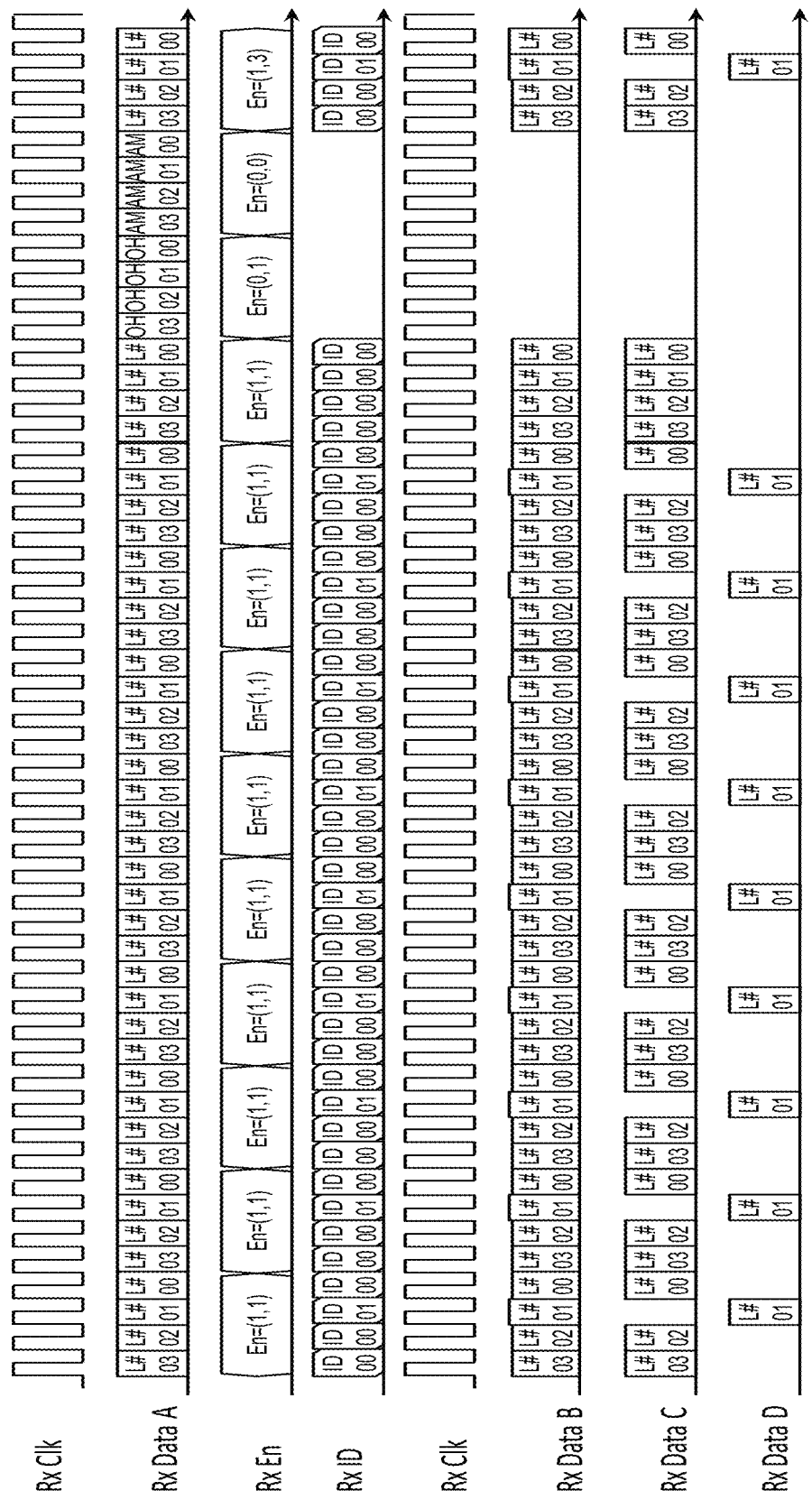
FIG. 16 is a schematic diagram of receiving a signal from a PCS layer at a reconciliation sublayer according to Embodiment 1 of the present invention.
Figure 17:
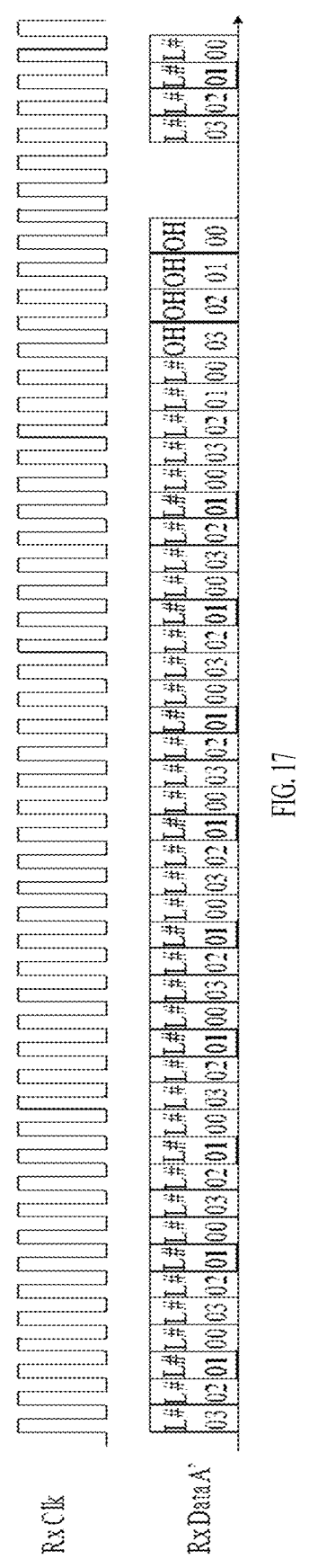

As shown in FIG. 16, after clock recovery and data recovery are performed at the physical layer of the receive end, <Rx Clk> and a corresponding data sequence before decoding are obtained. On the one hand, the synchronization alignment code blocks AM0 to AMn are identified synchronized, and aligned at the PCS, and the AM0 to AMn have not undergone scrambling processing and are on the lanes 0 to n. At this time, missions of the AM0 to AMn are complete, and a <Rx En> sequence may be output at the PCS. On the other hand, a <Rx Data A> data sequence is recovered at the PCS after the data sequence is decoded and descrambled. <Rx En> and a location indication of the synchronization alignment code blocks AM0 to AMn on the lanes 0 to n have a same meaning. Optionally, <Rx Data A>, for example, <Rx Data A'> in FIG. 17, may not include meaningful AM0 to AMn data information. <Rx Clk>, <Rx En>, and <Rx Data A> are transmitted to an MII reconciliation sublayer master module of the receive end for processing. The MII reconciliation sublayer master module of the receive end determines, according to an <Rx En> explicit indication indicated by a frame cycle of an alignment codeword on a fixed lane and with reference to a physical coding sublayer logical lane on a receive side and a corresponding frontend service ID and a corresponding backend service ID, belonging of a bandwidth granularity in each clock cycle by using Cn_subframe in subframe overheads OH0 to OHn. <Rx Clk>, <Rx En>, <Rx ID>, and <Rx Data B> are transmitted to an adaptation sublayer of each service interface, and under an indication of <Rx Clk>, <Rx En>, and <Rx ID>, data transmitted to each adaptation sublayer is received and extracted at the sublayer. Data that is obtained when <Rx En>=(1,1), (1,2), or (1,3) and <Rx ID>=0 is received and extracted at an Ethernet adaptation sublayer (Ethernet reconciliation sublayer, ID=0). Data that is obtained when <Rx En>=(1,1), (1,2), or (1,3) and <Rx ID>=1 is received and extracted at a CPRI adaptation sublayer (CPRI reconciliation sublayer, ID=1).

In addition, it should be specifically noted that a receiver needs to relatively fast learn a value of Cn and determine belonging and arrangement of a bandwidth granularity in a subframe corresponding to Cn. If the receiver cannot complete calculation in a relatively short time to determine belonging of each bandwidth granularity, it is recommended that an overhead block (OverHead) be transmitted in a previous frame. That is, an overhead block in a current subframe indicates bandwidth granularity allocation in a next subframe, and so on. In this way, the receiver has enough time to respond, to perform calculation to learn belonging of a bandwidth granularity in a subframe.

Embodiment 2

A case of hybrid bearing of a CPRI-10 in a bit multiplexing timeslot that is developed in a 100GE Ethernet link is described in the following.

A frame synchronization header of a CPRI-20 originally has 20 0x50 bytes. To cooperate with use of 64/66b coding, an adaptation sublayer of the CPRI-20 uses an end of frame character /T/=0xFD and a start of frame character /S/=0xFB to respectively replace the eighth byte and the ninth byte (#Z.0.7 and #Z.0.8) of the synchronization header that is of 20 0x50 bytes and that is of the CPRI-20, uses TXC=1 as a control character for an MII interface, and makes the character /S/ appear in the first byte of a bandwidth granularity of a 64/66b code block. There are also three types of 64/66b code blocks.

A frame synchronization header of a CPRI-10 may also be processed in a same manner as that of the frame synchronization header of the CPRI-20. The frame synchronization header of the CPRI-10 originally has 10 0x50 bytes. To cooperate with use of 8/10b coding, the first byte and the second byte that are replaced with 0xBC and 0x50/C5 remain to be 0x50 bytes. That is, the eighth byte and the ninth byte (#Z.0.7 and #Z.0.8) are replaced with a T/S character, so as to cooperate with use of 64/66b coding by using an Ethernet PCS. There are also three types of code blocks. This is the same as that of the CPRI-20. It is assumed that the CPRI-10 and a statistical multiplexing packet service of a 100GE Ethernet having relatively small effective traffic share and multiplex a 100GE physical interface and link. In this embodiment, data of the CPRIx20 circuit interface with a nominal constant bit rate (CBR) is multiplexed to the first physical coding sublayer logical lane (Lane 0) of a 100GE physical interface with a nominal rate.

Bandwidth resources are allocated according to a 64/66b block. A nominal frame frequency of a subframe of a multiplexed frame is Fc=(100*10^9)/64/20/16384*3=14305.11474609375 frames/second, and a quantity of bandwidth granularities of the subframe is 5460 (64/66b blocks). For a nominal rate of the CPRIx10, (0.49152*10^9)/64*10/Fc=5368. 70912 bandwidth granularities of each multiplexed subframe need to be allocated. Therefore, 5369 bandwidth granularities or 64/66b blocks are allocated in each of 70912 subframes of 100000 subframes, and 5368 bandwidth granularities or 64/66b blocks are allocated in each of 100000−70912=29088 subframes. In this way, an average quantity of allocated bandwidth granularities or 64/66b blocks can be approximately 5368.70912. To be as evenly as possible, because 70912:29088=2.437843784378438:1, one subframe in which 5368 bandwidth granularities are allocated exists approximately every two or three subframes in which 5369 bandwidth granularities are allocated, so that a buffering need is reduced. A specific implementation is basically the same as that of Embodiment 1. Refer to FIG. 10 to FIG. 17, details are not described again herein.

In addition, determining belonging of each bandwidth granularity in each subframe relies on Cn_subframe, and a receive end also relies on Cn_subframe to perform accurate data demultiplexing. Therefore, reliable transmission of Cn_subframe is essential. In this case, for transmission of coded information of Cn_subframe and a Cn_subframe change, redundancy and check may be introduced. There are many different manners of introducing redundancy and check, for example, multiple transmissions, and additional transmission of parity check results of CRC8 and BIP8. An example implementation diagram of multiple transmissions is given in FIG. 18.

Figure 18:
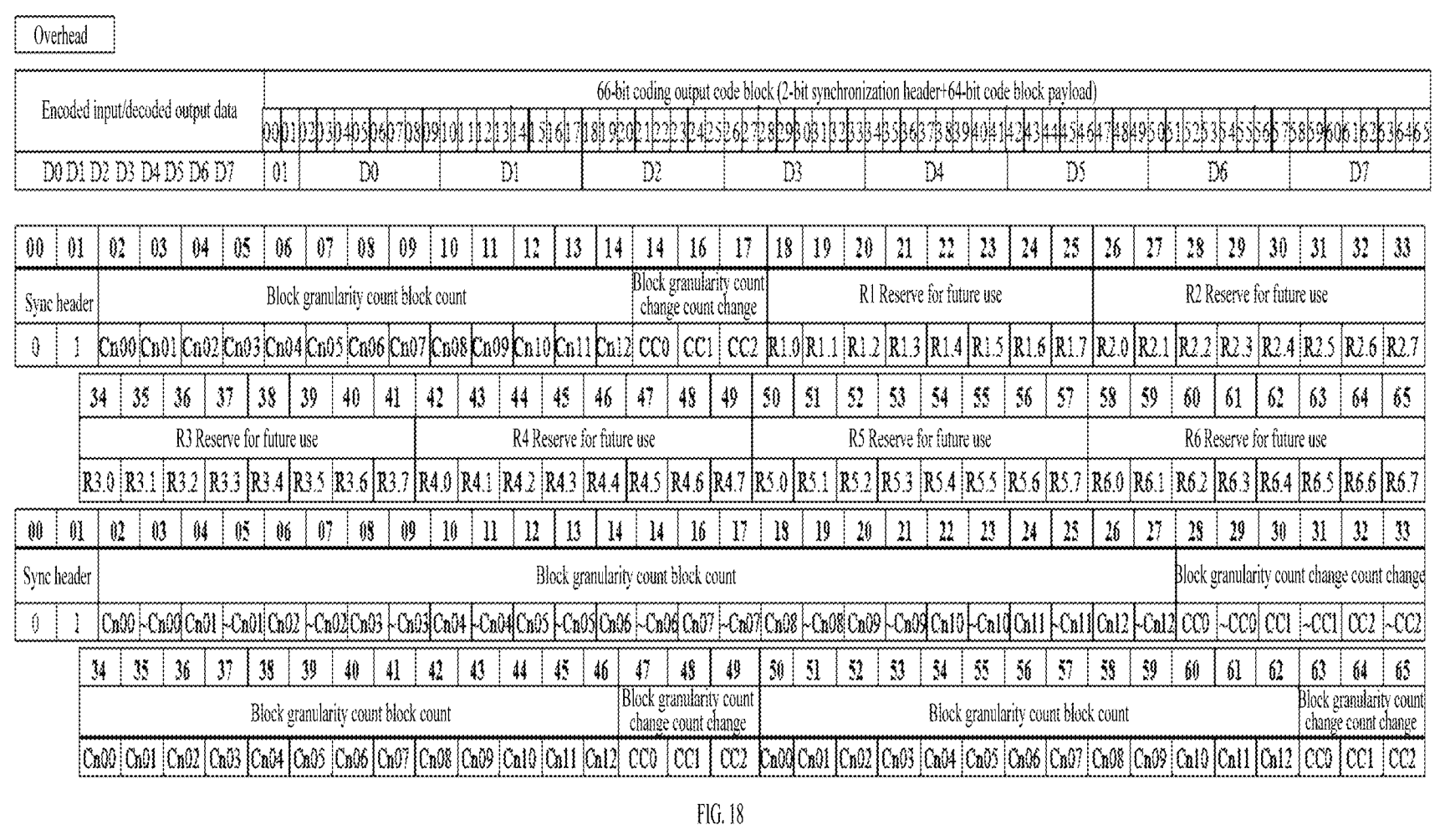

A reserved byte in an overhead block of Embodiment 1 is shown in FIG. 18, and may be further used. Coded information of Cn_subframe and a Cn_subframe change is transmitted for three times or more. In addition, both an original binary value of a bit and a negated binary value (a negated value of a binary 1 is 0, and a negated value of a binary 0 is 1) of the bit may be transmitted, so as to ensure reliable transmission of Cn and detection of an error. For example, coding is as follows.

TABLE 8

| Original value of Cn_subframe change | | Cn change indication of 64/66b block granularities CC2 CC1 CC0 | | | | | |
|---|---|---|---|---|---|---|---|
| CC2 CC1 CC0 | Meaning | Original | Negated | Original | Negated | Original | Negated |
| 0b 000 | Cn is the same as that of a previous subframe | 0 | 1 | 0 | 1 | 0 | 1 |

TABLE 8-continued

| Original value of Cn_subframe change | | Cn change indication of 64/66b block granularities CC2 CC1 CC0 | | | | | |
|---|---|---|---|---|---|---|---|
| CC2 CC1 CC0 | Meaning | Original | Negated | Original | Negated | Original | Negated |
| 0b 001 | Cn is 1 greater than that of the previous subframe | 0 | 1 | 0 | 1 | 1 | 0 |
| 0b 010 | Cn is 2 greater than that of the previous subframe | 0 | 1 | 1 | 0 | 0 | 1 |
| 0b 011 | Cn is 3 greater than that of the previous subframe | 0 | 1 | 1 | 0 | 1 | 0 |
| 0b 100 | A change between Cn and that of the previous subframe exceeds +/−3 | 1 | 0 | 0 | 1 | 0 | 1 |
| 0b 101 | Cn is 1 less than that of the previous subframe | 1 | 0 | 0 | 1 | 1 | 0 |
| 0b 110 | Cn is 2 less than that of the previous subframe | 1 | 0 | 1 | 0 | 0 | 1 |
| 0b 111 | Cn is 3 less than that of the previous subframe | 1 | 0 | 1 | 0 | 1 | 0 |

Figure 19:
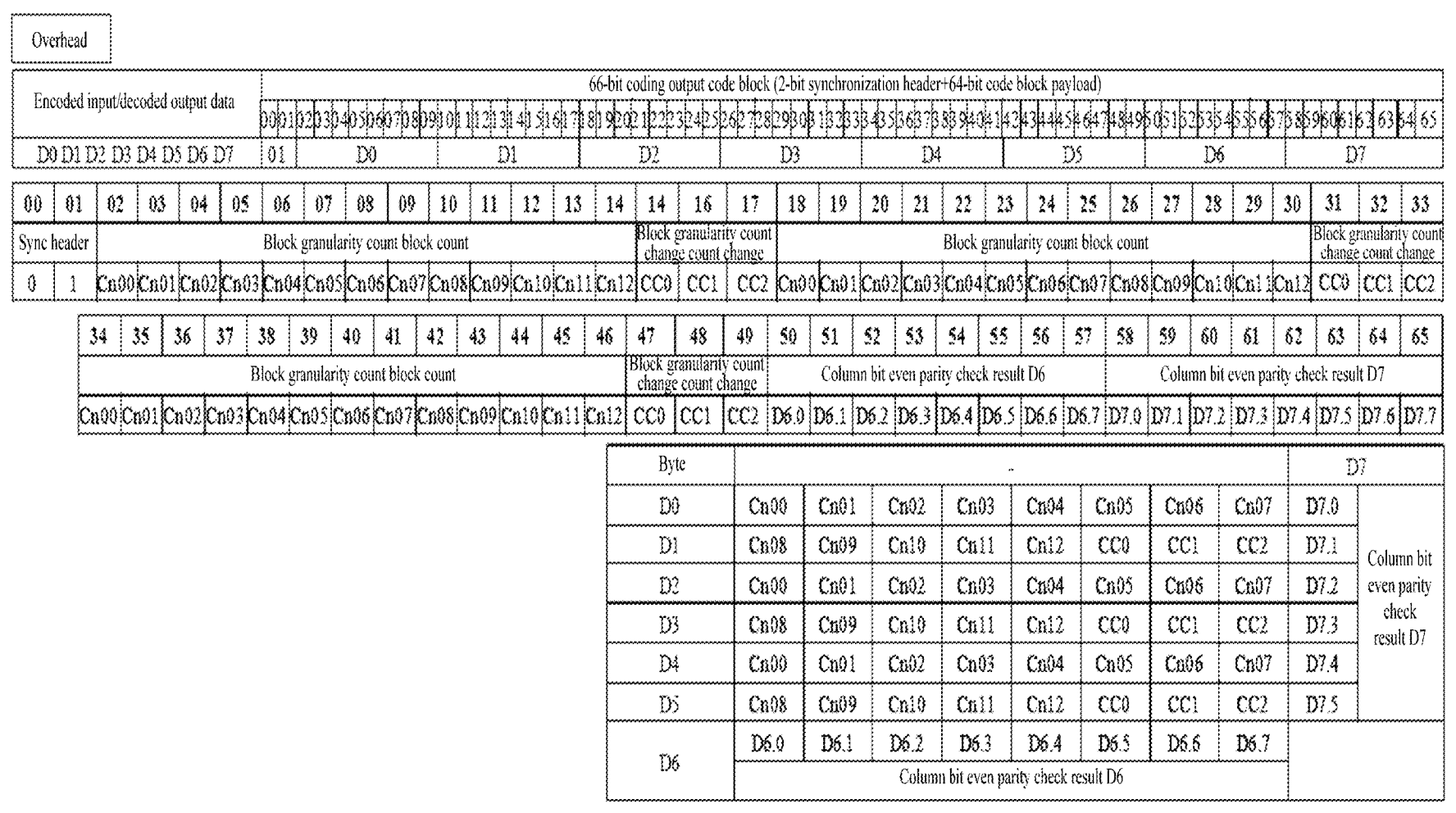

As shown in FIG. 19, both multiple transmissions and combination of row even parity check and column even parity check are alternatively introduced. Because of row and column check, an error of one bit may be rectified, and errors of multiple bits may be discovered. With reference to coded information of Cn_subframe and a Cn_subframe change that are retransmitted for multiple times, reliable transmission and reception of Cn_subframe and the Cn_subframe change can be ensured by using a majority consensus rule.

In addition, if a shared and multiplexed physical interface is a codec using 8b/10b, a definition of a synchronization header byte of a current frame of the CPRIx10 may be reserved. However, transmission, of coded information of a shared-and-multiplexed-frame structure and overhead information, especially Cn_subframe and a Cn_subframe change, needs to be redesigned.

Embodiment 3

How to apply a multiplexing technology provided in this embodiment of the present invention to OTN data is described in the following.

A before-coded information rate of an interface of an OTN OTU2/ODU2 is greater than a before-coded information rate of a LOGE Ethernet interface, and also greater than a before-coded information rate of one physical coding sublayer lane of 10G bandwidth of a 40GE, and a sum of before-coded information rates of two physical coding sublayer lanes of 5G bandwidth of a 100GE. As a result, the ODU2 or OTU2 cannot be multiplexed to one physical coding sublayer lane of 10G bandwidth of the 40GE with a nominal rate, and a 10GE physical interface with a nominal rate for transmission cannot be reused either, and speeding up or needs other processing needs to be performed. Two physical coding sublayer lanes of the 40GE are used in this embodiment.

TABLE 9

| OPU/ODU/OTU type | Nominal bit rate | ODU bit-rate tolerance |
|---|---|---|
| OPU0 | 238/239 × 1 244 160 kbit/s | ±20 ppm |
| OPU1 | 2 488 320 kbit/s | |
| OPU2 | 238/237 × 9 953 280 kbit/s | |
| ODU0 | 1 244 160 kbit/s | |
| ODU1 | 239/238 × 2 488 320 kbit/s = 2.4988 Gbps | |
| ODU2 | 239/237 × 9 953 280 kbit/s = 10.0373 Gbps | |
| OTU1 | 255/238 × 2 488 320 kbit/s = 2.6661 Gbps | |
| OTU2 | 255/237 × 9 953 280 kbit/s = 10.7092 Gbps | |

Figure 20:
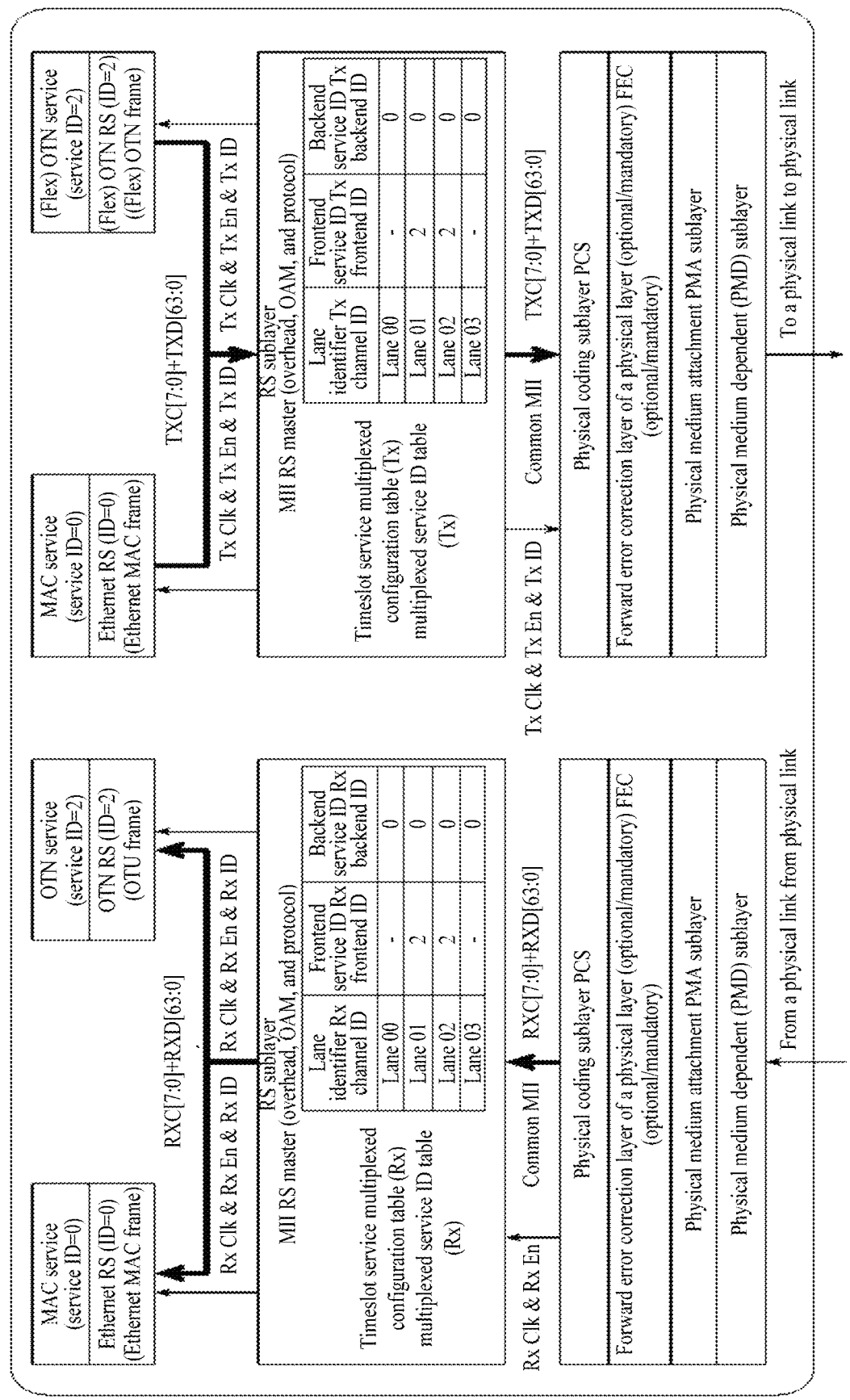
FIG. 20 is a diagram of a system architecture in an implementation according to Embodiment 3 of the present invention.

An OTU2 signal is a typical time-division multiplexing (TDM) signal. That an OTU2 signal and an Ethernet statistical multiplexing packet share and are multiplexed to one 40GE interface is described in this embodiment. Two physical coding sublayer logical lanes lane 1+lane 2 in the 40GE are used in this embodiment. The OTN and the OTU2 are a frontend service on the two lanes, and has an allocated ID that is denoted as ID=2. A statistical multiplexing Ethernet packet service is a backend background service that is on all lanes and whose ID=0. A transmit end and a receive end obtain such configuration information or determine a service ID configuration table through negotiation by using a protocol, as shown in FIG. 20.

From a perspective of quantities, 5824 or 5825 bandwidth granularities of 64/66b code blocks are allocated to an OTU2 signal in each subframe on average. This exceeds a total quantity (5460) of allocatable bandwidth granularities in each subframe on a single lane from prospective of a quantity. Two cascaded 40GE physical coding sublayer lanes (timeslot) are required for allocating bandwidth granularities to the signal.

There are different manners of allocating bandwidth granularities on two lanes lane 00+lane 01, for example, the following manner 1 and manner 2, as shown in Table 10. Because both configured IDs of frontend services of the two lanes are 2, Cn_subframe is a sum of Cn values of the two lanes, that is, Cn_subframe=Cn2+Cn1.

TABLE 10

|  | Manner 1 | | Manner 2 | |
| --- | --- | --- | --- | --- |
| First lane lane 01 | Cn1 = 5460 | Cn1 = 5460 | Cn1 = 2912 | Cn1 = 2912 |
| Second lane lane 02 | Cn2 = 364 | Cn2 = 365 | Cn2 = 2912 | Cn2 = 2913 |
| Cascade the first lane and the second lane lane 01 + lane 02 | Cn2 + Cn1 = 5824 | Cn2 + Cn1 = 5825 | Cn2 + Cn1 = 5824 | Cn2 + Cn1 = 5825 |

Figure 21:
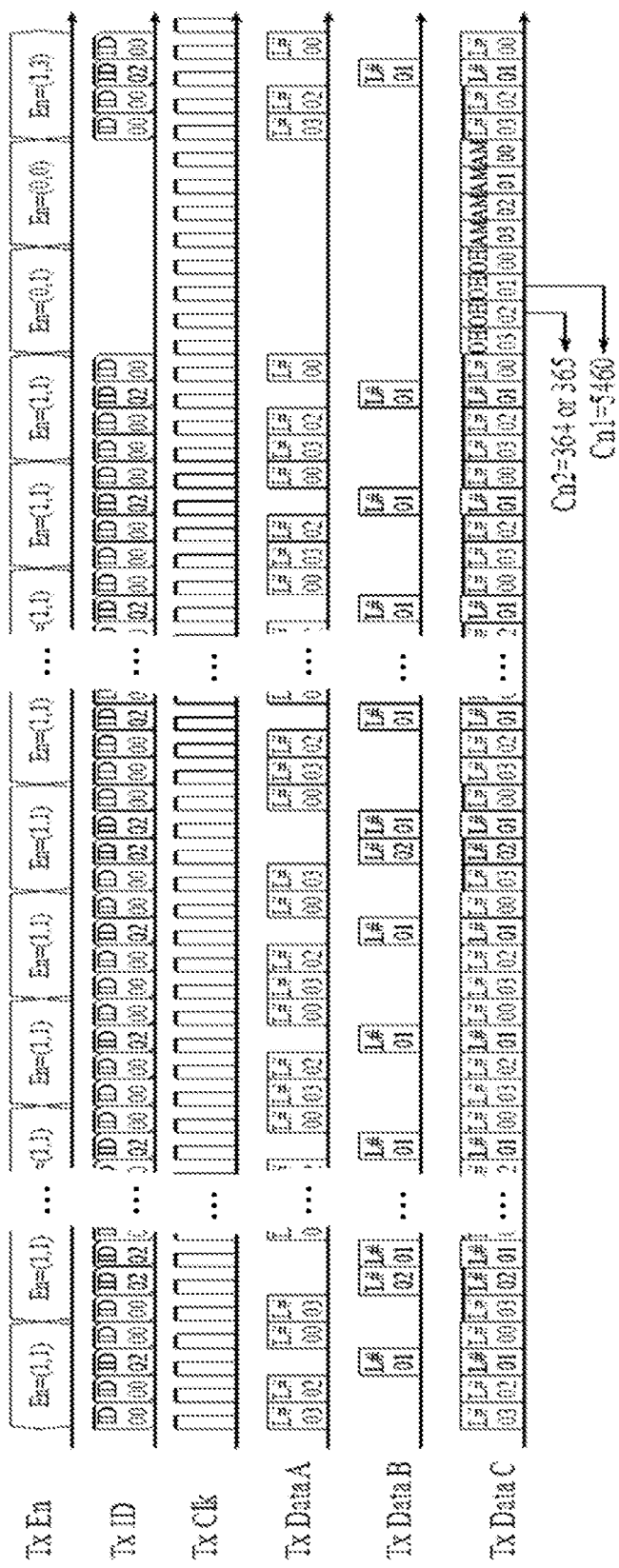
FIG. 21 is a schematic diagram of a Cn value indication according to Embodiment 3 of the present invention.

The two manners have almost a same effect. Manner 1 is used as an example. Distribution of bandwidth granularities in Manner 1 is shown in FIG. 21 and is more uniform than that of Manner 2. Manner 1 is recommended herein. An entire first lane 01 are allocated, and one bandwidth granularity, required for quite a period of time, of a second lane 02, is added at appropriate time, so that 364 or 365 granularities are evenly distributed in a subframe.

Figure 22:
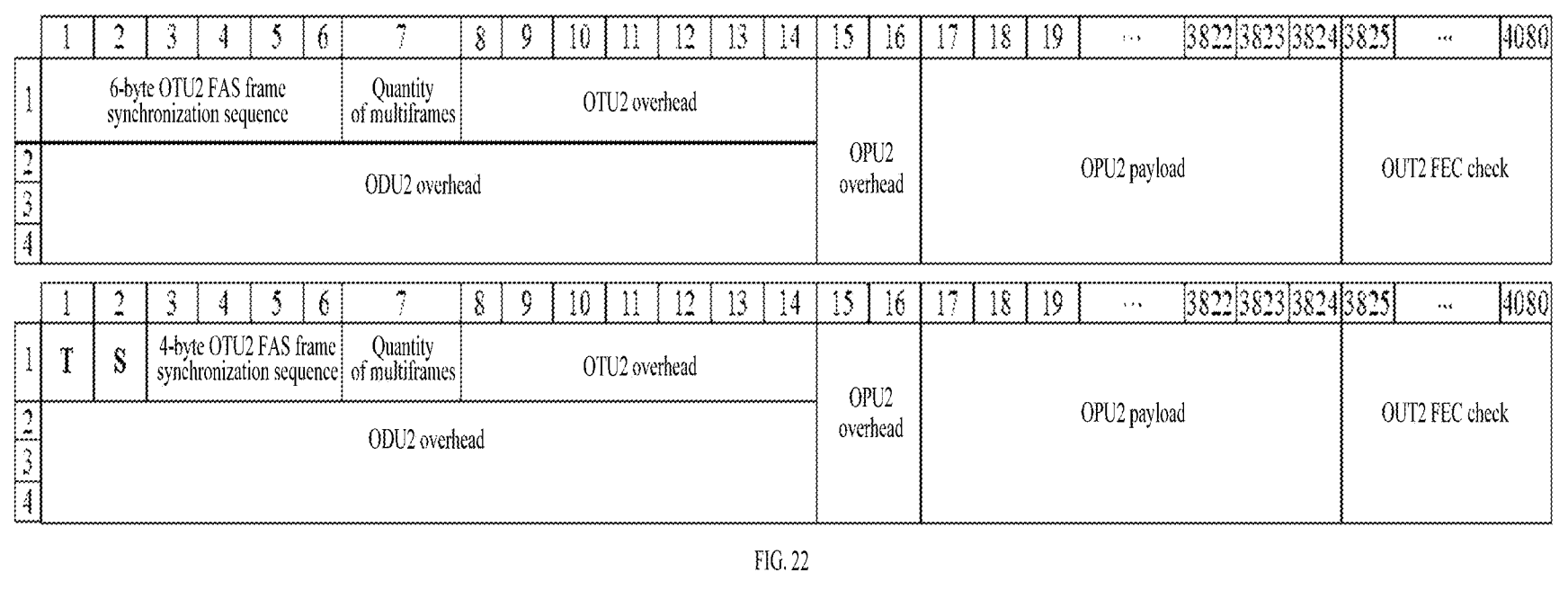

The OTN has a frame structure with a fixed length. An OTN frame itself has a 6-byte alignment sequence FAS=<OA1, OA1, OA1, OA2, OA2, OA2>, where OA1=0xF6 and OA2=0x28, and FAS is a fixed bit pattern. Accordingly, framing is performed on the OTN with reference to scrambling processing performed by a physical layer on data other than FAS. Optionally, an original structure of an OTU2 frame may be reserved in this embodiment, and a task of framing may be handled at an OTN reconciliation sublayer, or framing of an OTU frame may be instructed by an MII reconciliation sublayer master module of the present invention in combination with a 64/66b coding function of a physical coding sublayer. As shown in FIG. 22, the first byte and the second byte of the OTU2 frame: OA1 and OA1 are replaced by T and S characters matching the 64/66b coding function of the physical coding sublayer, so as to indicate a start and an end of the frame.

Figure 23:
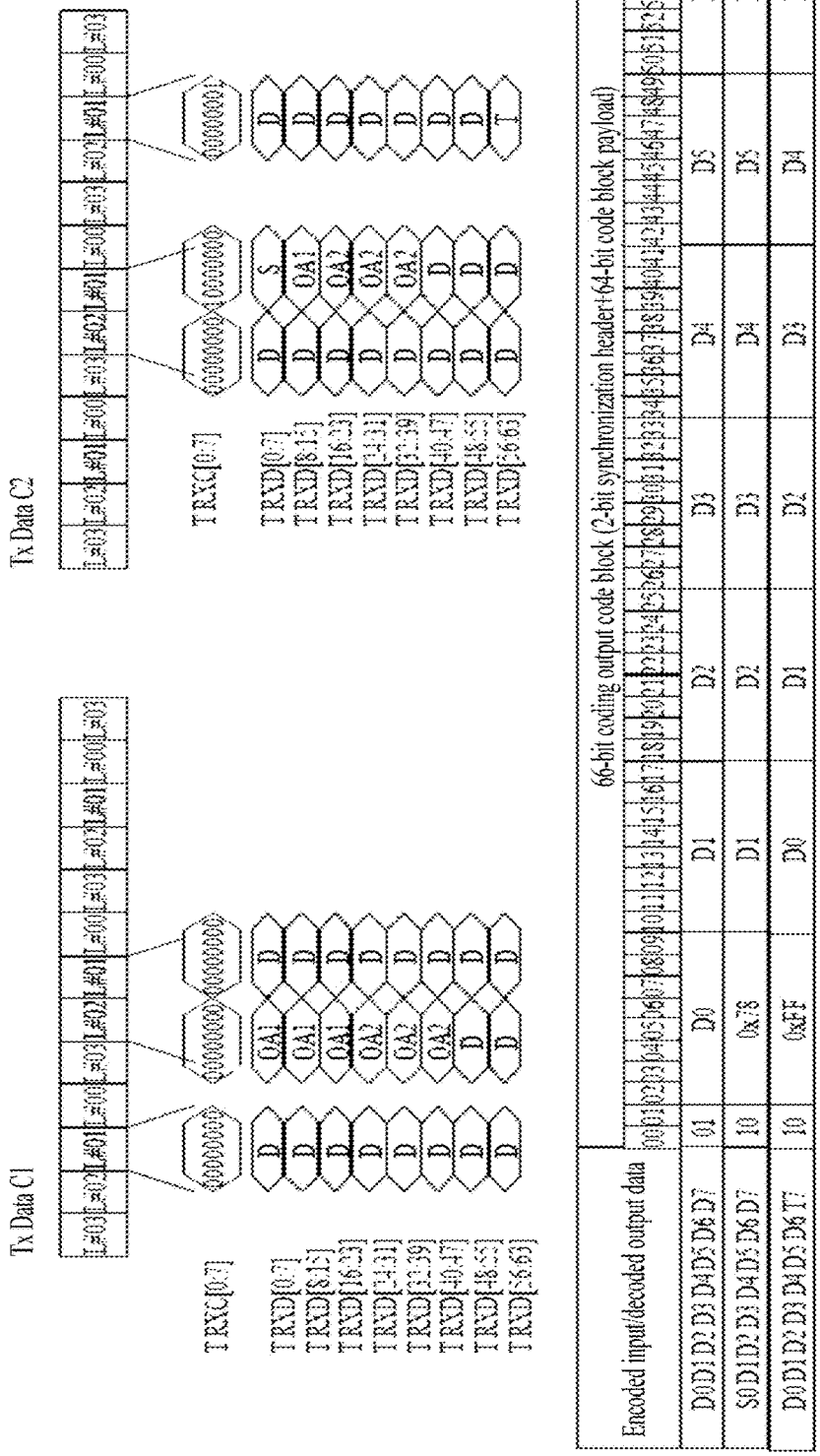
FIG. 23 is a schematic diagram of a principle for sharing an Ethernet interface by OTN signals according to Embodiment 3 of the present invention.

Another difference between the foregoing two framing manners lies in accompanying character attribute indication information TXC\RXC of a transmitted and received data sequence. Accompanying character attribute indication information of the former is all 0, OA1 and OA2 bytes are also used as data bytes to be indicated as TXC\RXC=0, and this is the same as that of another data byte <D>. The latter uses T and S character bytes as a control byte to be indicated as TXC\RXC=1. As shown in FIG. 23, the former is shown as Tx Data C1, and there is only one encoded code block type. The latter is shown as Tx Data C2, and there are three encoded code block types.

For implementation of the latter: in a transmit direction, the first byte and the second byte of the FAS field of the OUT1 frame may be simply replaced at the OTN reconciliation sublayer with the /T/ and /S/ characters, and then the OUT1 frame is transmitted to a physical layer function such as a 64/66b physical coding sublayer by using an MII interface with a 8-byte 64-bit TXD/RXD data bit width and 8-bit TXC/RXC, for coding and transmission. In a receive direction, the MII receives MII interface data that is decoded and output at the physical layer, and recovers the two OA1 bytes of the original FAS from the /T/ and /S/ characters, so as to recover the OTU1 frame. Data transmitted by using the MII interface follows a rule that the S character appears in the first byte TXD/RXD[0:7]. For the former, the entire OTU1 frame is considered as data bytes, and no such a special requirement is imposed. A case of the CPRI interface is also similar.

It should also be noted that transmission of FEC overheads included in the OTN frame is optional in this embodiment, because FEC is a task of a physical interface layer. In this embodiment, a lower layer has an optional FEC function, to ensure transmission bit error rate performance of a system.

It should be noted that a technology for adding /T/ and /S/ characters to an OTN data stream and transmitting the OTN data stream by using an Ethernet MII interface has been described in detail in the Chinese patent 201410805443.8 that is incorporated in this Patent application by reference in its entirety.

Embodiment 4

Marking of a frontend service ID and a backend background service ID lays a foundation for sharing a physical interface link by multiple services.

Figure 24:
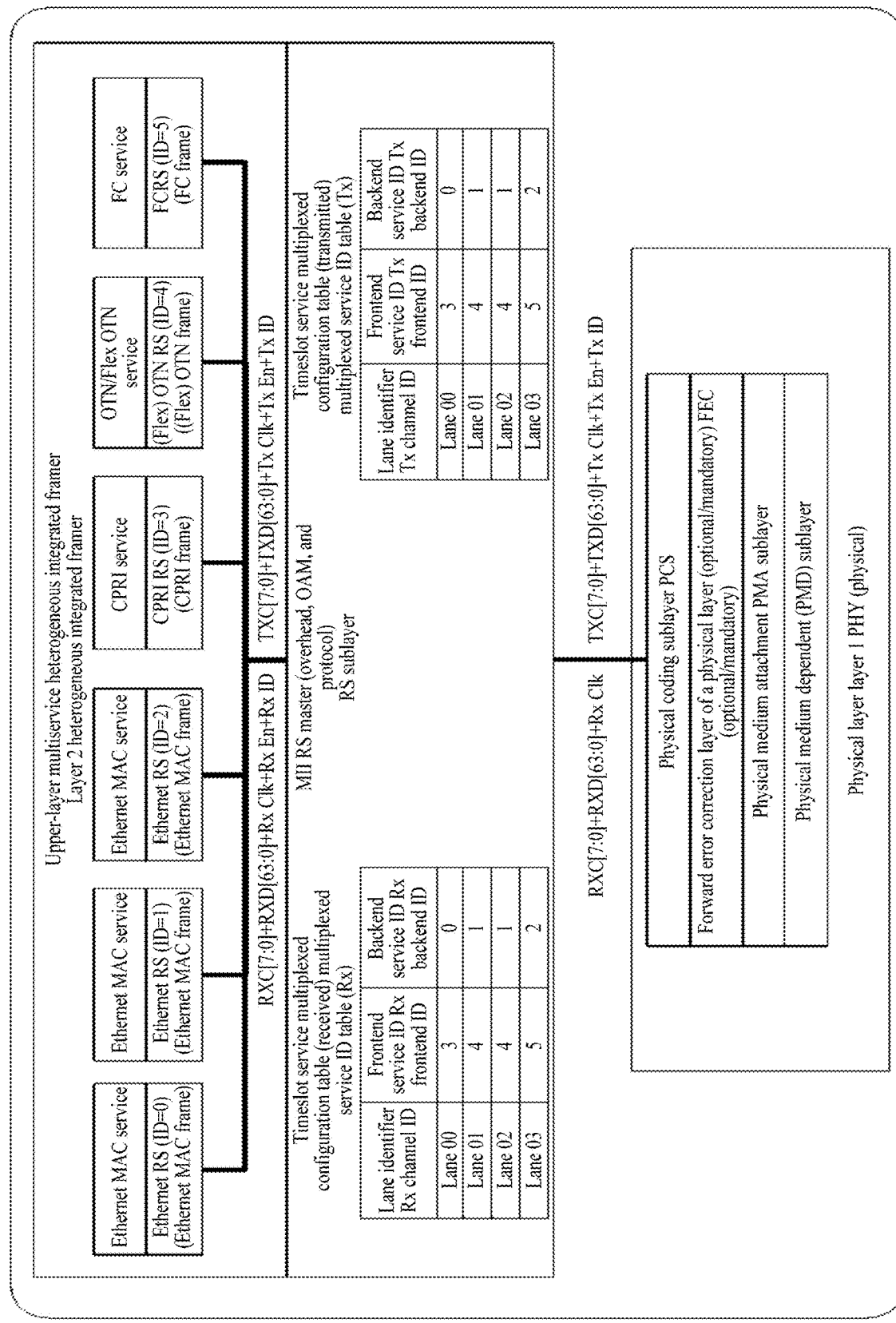
FIG. 24 is a diagram of a system architecture in an implementation according to Embodiment 4 of the present invention.

As shown in FIG. 24, the interface may multiplex three logical Ethernet statistical multiplexing packet services and a CBR CPRI service, a CBR OTN service, a statistical multiplexing fiber channel service, and the like. Different service IDs are assigned to services and a service is assigned to a different Ethernet physical coding sublayer logical lane as a frontend service or a backend background service. In the following figure, a physical layer interface and link of a 40GE are used as an example, and three packet statistical multiplexing Ethernet logical subport services whose IDs are ID=0, ID=1, and ID=2 respectively, a CPRI-100 service whose ID=3 of a CBR circuit, an OTU2 service whose ID=4 of a CBR circuit, a fiber channel FC (1G\2G\4G\8G) service whose ID=5, and the like are used as examples. Fiber channel FC itself is a packet-based technology, but it can be considered as a CBR circuit according to its physical interface rate, or it can be considered as a packet statistical multiplexing service like the Ethernet. This specifically depends on an application scenario and an implementation requirement for a fiber channel reconciliation sublayer function module. Herein, it is assumed that the fiber channel is a CBR service of different rate levels such as FC-1G\2G\4G\8G. That is, the fiber channel service, the CPRI service, and the OTN service are all CBR circuit services.

As shown in FIG. 24, on a 40GE physical interface, a frontend service of a lane 00 is a CPRI-10 service whose ID=3 of a CBR circuit, a backend background service of a lane 00 is a packet statistical multiplexing Ethernet logical subport service whose ID=0. The two services both have approximately 5G bandwidth and share the lane 00, but CPRI bandwidth is slightly smaller. Frontend services of the lane 01+lane 02 are OTU2 services whose ID=4 of the CBR circuit, backend background services of the lane 01+lane 02 are packet statistical multiplexing Ethernet logical subport services whose ID=1. Both services have approximately 10G bandwidth and share the two channels lane 01+lane 02, and OTU2 bandwidth is slightly greater. A case in which a fiber channel FC (1G\2G\4G\8G) service whose ID=5 and that serves as a frontend service and a packet statistical multiplexing Ethernet logical subport service whose ID=2 and that serves as a backend background service share a lane 03 is similar. It is even allowed that an OTN and a fiber channel service switch service rate levels without a service loss. For example, fiber channel switches from 2G to 4G or switches from 4G to 2G. Cn_subframe is switched from a value approximating an expected value of FC-2G to a value approximating an expected value of FC-4G.

Embodiment 5

As a rate of a high-speed Ethernet interface increases, a greater interface rate difference becomes greater, for example, a current common GE, a LOGE, a 40GE, a 100GE, and a 400GE. A smallest interface rate difference is 9G, and a maximum interface rate difference is 300G. A requirement for some packet statistical multiplexing Ethernet interfaces of intermediate bandwidth granularities, such as 30G and 80G, is difficult to meet.

Figure 25:
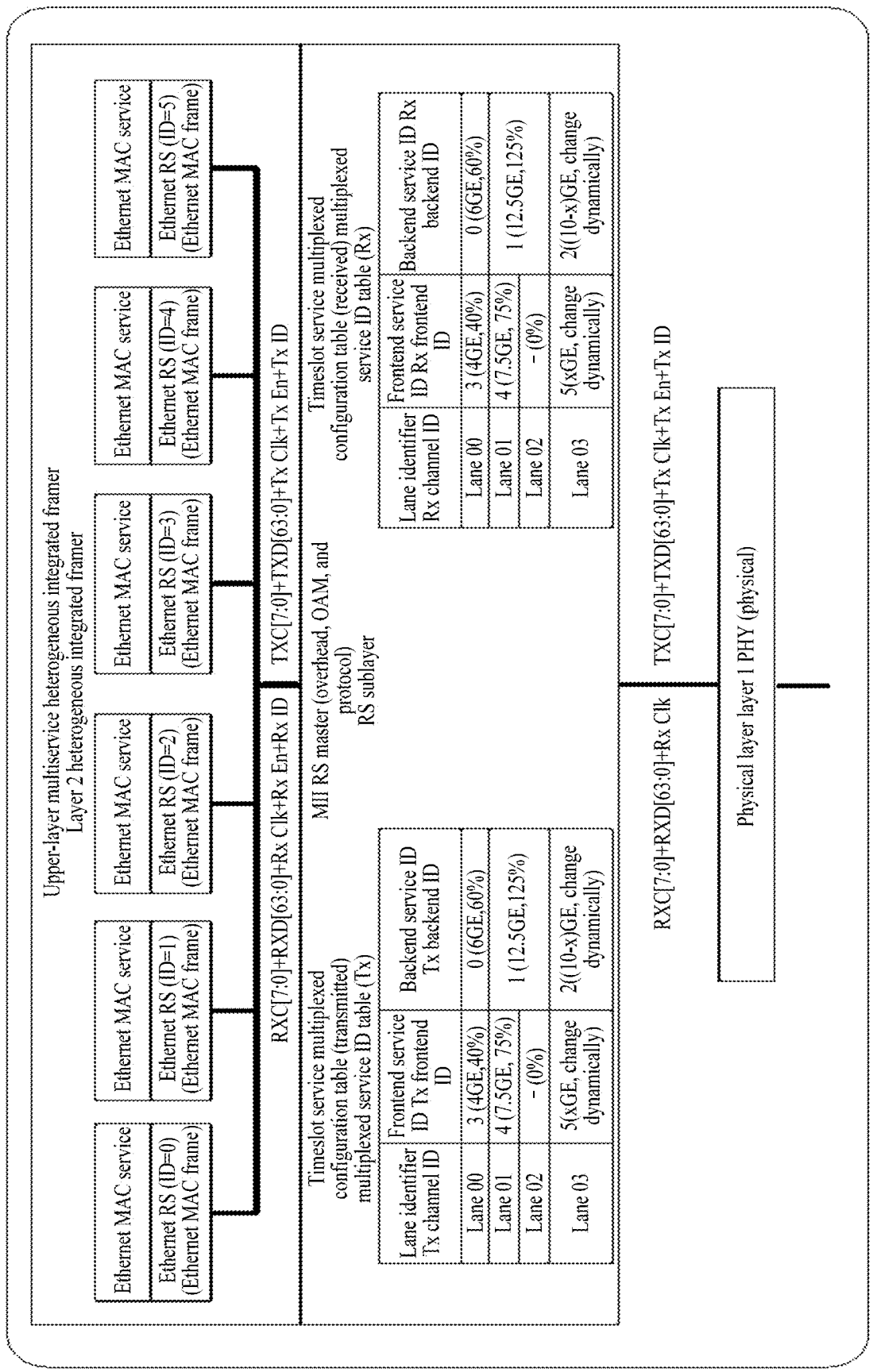
FIG. 25 is a diagram of a system architecture in an implementation according to Embodiment 5 of the present invention.
Figure 26:
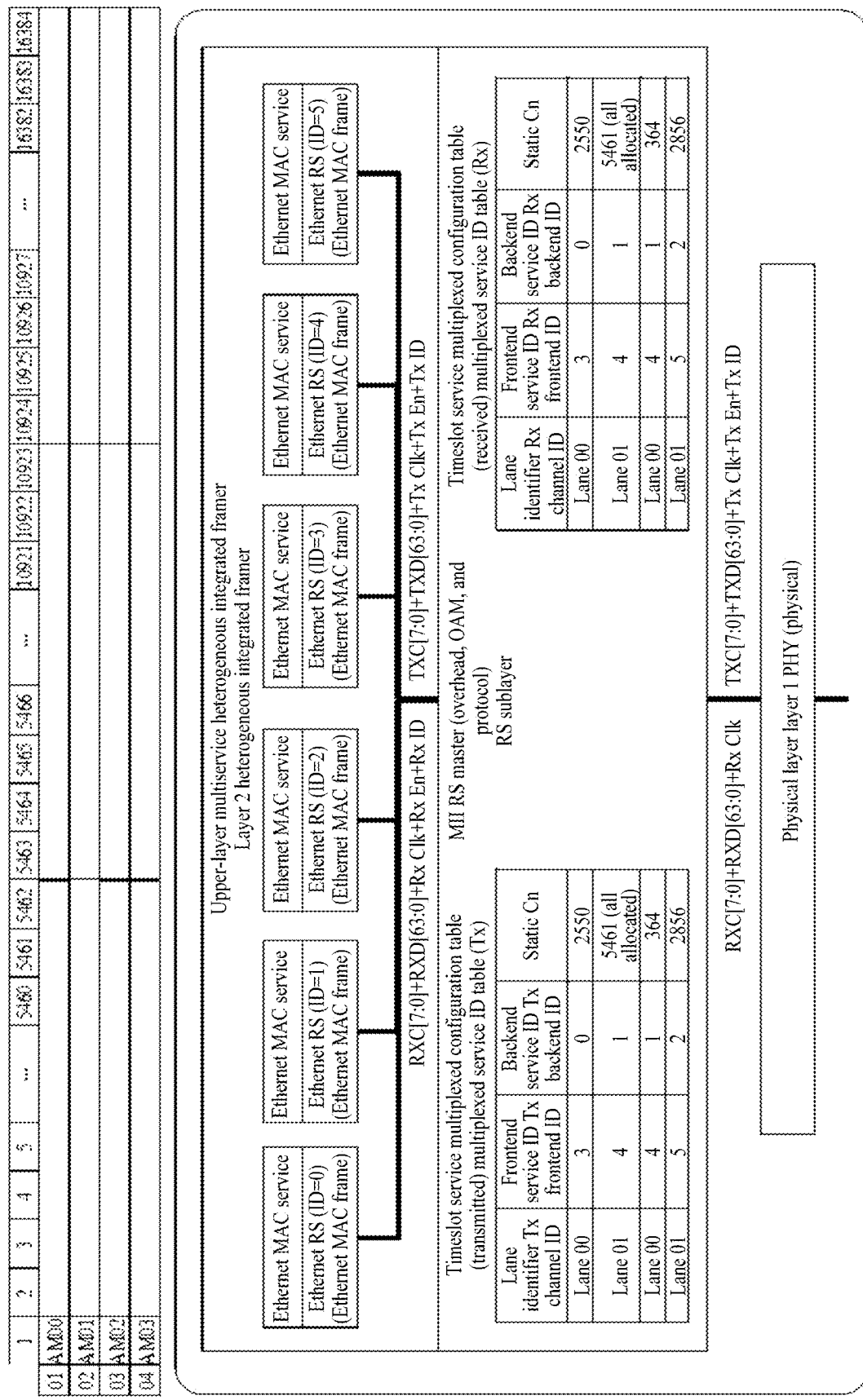
FIG. 26 is a diagram of a system architecture in another implementation according to Embodiment 5 of the present invention.

As shown in FIG. 25, in the present invention, a high-speed interface is divided into physical coding sublayer logical lanes, and a frontend logical subport and a backend logical subport are introduced to a lane and a combination of lanes. In this way, bandwidth of the lane or the combination of lanes may be flexibly allocated to the two logical subports by using Cn_subframe. Bandwidth accounting for a value with a few digits after a decimal point of a total bandwidth may even be implemented or bandwidth may be even allocated in terms of percentage. For example, the 100GE is divided into a 28.55GE and a 71.45GE, or 89% and 11% of an 80GE. Considering a characteristic of the packet statistical multiplexing Ethernet service, Cn_subframe may be the same as that of the foregoing embodiment, that is, may change around a value approximating an expected value, and may be explicitly indicated in overheads. Explicit indication helps the system implement bandwidth adjustment control of a service of the system without a service loss.

Alternatively, Cn_subframe is a fixed value, and is either configured by or determined through negotiation by both ends of a physical interface. Optionally, Cn_subframe does not need to be transmitted in the overheads. Therefore, an overhead block may not exist, and a bandwidth granularity of the overhead block may be allocated or reserved as an allocatable granularity. A bandwidth granularity may be allocated or reserved according to a subframe, or may be allocated or reserved according to an entire multiplexed frame with a length of 16384 granularities. No Cn_subframe is transmitted for indication, and only a static configuration is set for the system. Therefore, when bandwidth adjustment is performed, that is, when Cn_subframe needs to be changed, a difficulty for a receive end and a transmit end to perform synchronous matching is increased.

It should be noted that there is no need to change specifications of an existing Ethernet physical interface if there is no overhead indication. In this case, a current 40GE physical interface can be perfectly compatible with a 100GE physical interface in the present invention. This has a practical significance, and should deserve special attention.

Embodiment 6

It has been mentioned in Embodiment 5 that explicit indication of Cn_subframe and Cn_subframe change information in overheads helps the system implement bandwidth adjustment of a service of the system without a service loss.

Similarly, explicit transmission of service ID configuration information of a current subframe in the overheads helps the system implement service configuration adjustment of the service of the system without a service loss. Because of the explicit indication, completely based on the explicitly indicated Cn_subframe and Cn_subframe change information, frontend service ID information, and backend service ID information in the subframe overheads, a receive end and a transmit end multiplex and demultiplex data, thereby ensuring matching and synchronization of receiving and transmission.

Figure 27:
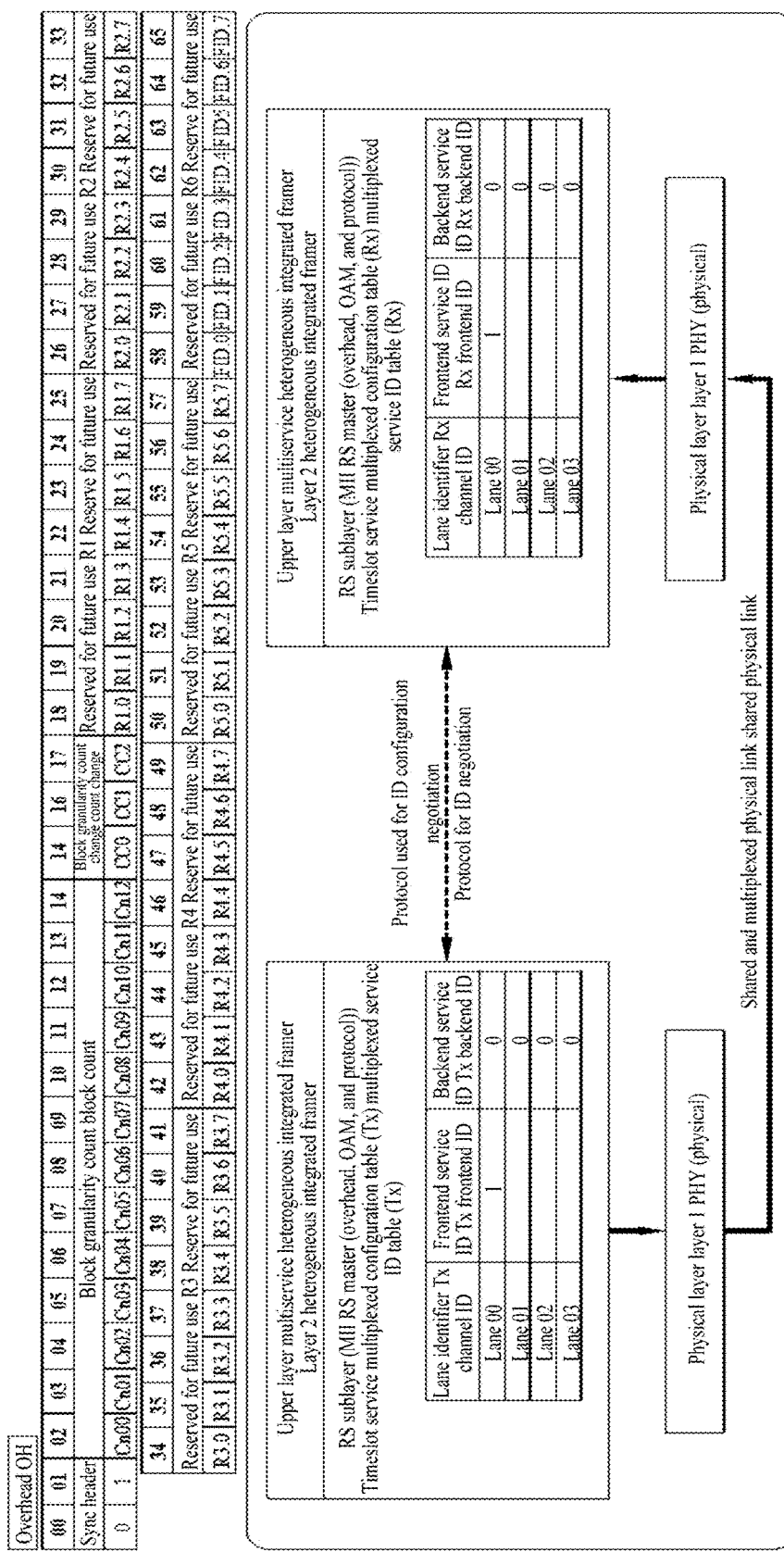
FIG. 27 is a schematic diagram of an overhead bearing area according to Embodiment 6 of the present invention.

As shown in FIG. 27, in some special cases, when all used backend service IDs are regarded by default as IDs of one basic backend background statistical multiplexing Ethernet service, for example, ID=0 is reserved to mark the service, backend service ID information does not need to be transmitted in the overheads, and only frontend service ID information needs to be transmitted.

Figure 28:
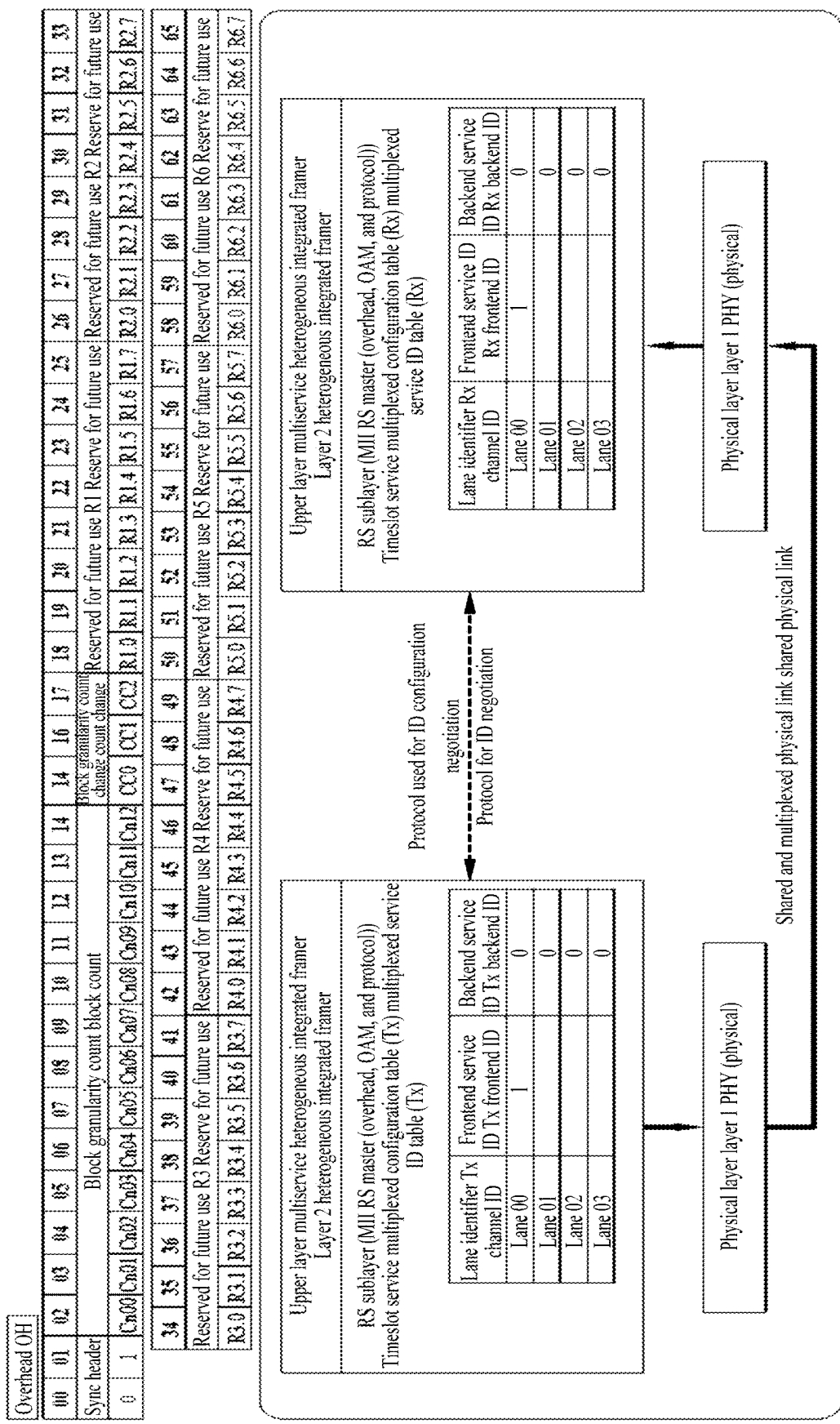
FIG. 28 is a diagram of another implementation according to Embodiment 6 of the present invention.

Further, as shown in FIG. 28, if neither the frontend service ID information nor the backend service ID information is transmitted in the overheads, negotiation of IDs of services sharing and multiplexing one link resource between the receive end and the transmit end of the link needs to be implemented in another manner, for example, by using a control plane protocol or a management plane protocol to negotiate possible adjustment. Alternatively, IDs and CN-subframe of services sharing and multiplexing one link resource are fixedly and statically configured by a management plane, and is not allowed to change during an enabling period of the services, otherwise, it is difficult to perform accurate demultiplexing.

Further, as described in Embodiment 5, the overhead block does not need to exist, and 16383 granularities in each multiplexed frame (5461 granularities in each subframe) may be allocated and reserved. If Cn_subframe and a Cn_subframe change are fixed static values, a fixed value of Cn_subframe may be negotiated by the both receive end and the transmit end by using a protocol or may be statically configured by the management plane.

Embodiment 7

In the foregoing embodiments, for each CBR service, a value and a sequence change of Cn_subframe are analyzed according to a nominal rate. In practice, there are differences between clock frequencies of various interfaces and nominal frequencies of the various interfaces. For example, an Ethernet interface, a CPRI interface, and a fiber channel interface allow an absolute frequency difference of +/−100 ppm from nominal frequencies, and both an SDH and an OTN allow an absolute frequency difference of +/−20 ppm from nominal frequencies. Therefore, in practice, Cn_subframe is determined by relying on a specific real rate of a CBR circuit interface. Division and flexible bandwidth configuration of statistical multiplexing Ethernet subports, such as sub-lane bandwidth division in terms of percentage in Embodiment 5, does not have such a requirement. In this embodiment, some feasible methods are provided for determining a quantity of bandwidth granularities allocated to the CPRI and OTN interfaces in each subframe.

If a quantity of allocatable 64/66b granularities of a shared and multiplexed Ethernet physical layer interface in a subframe is Pc.subframe, a quantity of 64/66b granularities used for overheads is Po.subframe, and a frequency of the subframe is F.subfame, an equivalent 64/66b coding line bandwidth granularity of a lane is $C.\text{subframe}=(Pc.\text{subframe}+Po.\text{subframe})*F.\text{subfame}.$ An equivalent 64/66b coding line bandwidth granularity of a circuit service with an uncertain rate is C.cbr. A CBR service whose C.cbr<=C.subframe may serve as a frontend service on a determined lane. C.cbr has a correspondence with a clock recovered by a clock and data recovery (CDR) of the service. C.subframe has a correspondence with a local reference clock of the shared and multiplexed physical layer interface. The CBR circuit service enters a clock isolation first-in first-out (FIFO) buffer memory under a beat of the recovered clock, and is taken out as required according to the local reference clock from the clock isolation FIFO buffer memory.

There are two manners. Manner 1: A count of the clock recovered by the CDR of the CBR service is compared with a count of a transmit reference clock of the shared and multiplexed physical interface.

A frequency of the local reference clock of the system is set as follows: F.SystemClock=(Pc.subframe+Po.subframe)*F.subfame*N/K=C.subframe*N/K, and the clock is used for counting of a counter with a count depth of (Pc.Subframe+Po.subframe)*N/K. The counter may generate and output a timing pulse with a frequency of F.subfame each time the count reaches the maximum and is cleared.

Another counter whose allowable count depth is also (Pc.subframe+Po.subframe)*N/K counts pulses of a clock frequency F.cbr=C.cbr*N/K that has a correspondence with the clock recovered by the CDR of the service. Each time a first counter reaches the maximum and is cleared, a count value of a second counter is read, and CounterValue*K/N is rounded and is output as Cn. In addition, Cn*N/K is subtracted from CounterValue of the second counter, so as to prepare for output of a next Cn value. Therefore, a feasible method for actually resolving the first step is provided, and it is ensured that the value of Cn_subframe matches a real rate of service data and tracks a change of the real rate.

Both N and K are positive integers. When N/K=1, one counting unit of a counter is corresponding to one bandwidth granularity; when N/K=2, one counting unit of a counter is corresponding to 0.5 bandwidth granularity; when N/K=3, one counting unit of a counter is corresponding to ⅓ bandwidth granularity; when N/K=⅔, one counting unit of a counter is corresponding to ⅔; when N/K=4, one counting unit of a counter is corresponding to 0.25 bandwidth granularity; and so on. Selection of an appropriate value of N/K facilitates implementation of a system, so as to allow a circuit such as a counter to work in an allowable specific frequency range.

A receive end may recover a circuit service clock from a line CDR clock of the receive end according to a relationship between Cn_subframe and (Pc.subframe+Po.subframe).

Manner 2: A length change of a queue in an FIFO buffer memory or a change of a write address in an FIFO buffer memory is monitored to adjust Cn_subframe is adjusted and track a change of the real rate.

As mentioned in Manner 1, data is written into the clock isolation FIFO buffer memory under the beat of the clock recovered by the CDR of the data. Like Manner 1, information about C.cbr*N/K can be obtained in Manner 2 by monitoring a write address of a data queue and a change of the write address, and an FIFO length change, so that Cn_subframe is obtained, Cn_subframe varies with the write address of the data queue and the change of the write address, and the FIFO length change, and it is ensured that the value of Cn_subframe matches a real rate of service data and a change of the real rate can be tracked.

Manner 2 is not only applicable to a CBR circuit service but also applicable to a VBR statistical multiplexing packet service.

Embodiment 8

When Cn_subframe and its change, and configurations of IDs of a frontend service and a backend service are all explicitly transmitted, Cn_subframe and the IDs of the frontend service and the backend service can be changed in real time as required.

When both the frontend service and the backend service are statistical multiplexing packet services, no strict constraint similar to that of a CBR circuit service is required for bandwidth of each service, a possible to-be-used manner is that Cn_subframe is explicitly transmitted and the IDs of both the frontend service and the backend service are implicitly indicated and transmitted in non-real time. In this case, a lane may be added or removed in the following manner.

In a case of a determined ID configuration, when 0<=Cn_subframe<=Pc.subframe, Cn_subframe may be adjusted for the frontend service and the backend service as required, so as to implement appropriate allocation of bandwidth between the frontend service and the backend service. When Cn_subframe=0 or Cn_subframe=Pc.subframe, the ID configuration may be adjusted and modified.

A quantity of lanes configured for the frontend service ID is reduced in the following manner.

1. Adjust Cn_subframe of a lane and determine that Cn_subframe=0; and explicitly transmit Cn_subframe and its change according to a rule.

2. Delete a configuration of the frontend service ID from a configuration table of the lane; and reach an agreement between the two ends through negotiation.

3. Continue to adjust Cn_subframe of the lane in which the frontend service ID is located, so as to reach expectation; and explicitly transmit Cn_subframe and its change according to a rule.

A quantity of lanes configured for the frontend service ID is increased in the following manner.

1. Adjust Cn_subframe of a lane and determine that Cn_subframe=0; and explicitly transmit Cn_subframe and its change according to a rule.

2. Add a configuration of the frontend service ID to a lane configuration table; and reach an agreement between the two ends through negotiation.

3. Continue to adjust Cn_subframe of the lane in which the frontend service ID is located, so as to reach expectation; and explicitly transmit Cn_subframe and its change according to a rule.

A quantity of lanes configured for the frontend service ID is reduced in the following manner.

1. Adjust Cn_subframe of a lane and determine that Cn_subframe=Pc.subframe; and explicitly transmit Cn_subframe and its change according to a rule.

2. Delete a configuration of the backend service ID from a configuration of the lane; and reach an agreement between the two ends through negotiation.

3. Continue to adjust Cn_subframe of the lane in which the frontend service ID is located, so as to reach expectation; and explicitly transmit Cn_subframe and its change according to a rule.

A quantity of lanes configured for the backend service ID is increased in the following manner.

1. Adjust Cn_subframe of a lane and determine that Cn_subframe=Pc.subframe; explicitly transmit Cn_subframe and its change according to a rule.

2. Add a configuration of the backend service ID to a lane configuration table; and reach an agreement between the two ends through negotiation.

3. Continue to adjust Cn_subframe of the lane in which the frontend service ID is located, so as to reach expectation; and explicitly transmit Cn_subframe and its change according to a rule.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read-only memory (ROM), a random access memory (RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention. Additionally, statements made herein characterizing the invention refer to an embodiment of the invention and not necessarily all embodiments.

What is claimed is:

1. A method for transmitting a service signal by using an Ethernet channel, wherein the Ethernet channel comprises multiple Ethernet physical coding sublayer (PCS) lanes, wherein each Ethernet PCS lane uses a bearing area with a fixed length for transmission, and wherein the method comprises:
   receiving, by a communications device, a first service signal and a second service signal, wherein the first service signal and the second service signal correspond to different types of services;
   multiplexing, by the communications device, the first service signal and the second service signal to the bearing area of an Ethernet PCS lane, wherein one part of the bearing area of the Ethernet PCS lane bears the first service signal, and another part of the bearing area of the Ethernet PCS lane bears the second service signal; and
   transmitting, by the communications device, the first service signal and the second service signal that are borne in the bearing area of the Ethernet PCS lane;
   wherein transmitting the first service signal and the second service signal that are borne in the bearing area of the Ethernet PCS lane further comprises: transmitting an indication signal, wherein the indication signal indicates a location of the bearing area of the Ethernet PCS lane.

2. The method according to claim 1, wherein the bearing area comprises an overhead bearing area and a payload bearing area; and
   wherein the overhead bearing area bears bandwidth indication information, wherein the bandwidth indication information is used to indicate bandwidth, occupied by the first service signal, in the payload bearing area.

3. The method according to claim 2, wherein the bandwidth indication information is bandwidth granularity quantity information, wherein the bandwidth granularity quantity information is used to indicate a quantity of bandwidth granularities, occupied by the first service signal, in the payload bearing area, wherein each bandwidth granularity has a fixed length.

4. The method according to claim 1, wherein the first service signal is a synchronous digital hierarchy (SDH) service signal, an optical transport network (OTN) service signal, or a common public radio interface (CPRI) service signal; and
   wherein the second service signal is an Ethernet service signal.

5. The method according to claim 1, wherein receiving the first service signal and the second service signal comprises:
   transmitting a service identifier signal and a clock signal to a transmit end of the first service signal and a transmit end of the second service signal, and receiving the first service signal transmitted by the transmit end of the first service signal and the second service signal transmitted by the transmit end of the second service signal;
   wherein when the service identifier signal is a first identifier corresponding to the first service signal, the transmit end of the first service signal transmits the first service signal, and the transmit end of the second service signal does not transmit a service signal; and when the service identifier signal is a second identifier corresponding to the second service signal, the transmit end of the second service signal transmits the second service signal, and the transmit end of the first service signal does not transmit a service signal.

6. The method according to claim 1, wherein transmitting the first service signal and the second service signal that are borne in the bearing area of the Ethernet PCS lane further comprises:
   transmitting the bearing area of the Ethernet PCS lane; and
   wherein the indication signal further indicates a location of an alignment marker (AM) corresponding to the bearing area.

7. The method according to claim 6, wherein the indication signal further indicates a location of an overhead bearing area of the bearing area and a location of a payload bearing area of the bearing area.

8. A communications device, wherein the communications device comprises a processor and a non-transitory memory having processor-executable instructions stored thereon, wherein the processor-executable instructions, when executed by the processor, facilitate:
   receiving a first service signal and a second service signal;
   multiplexing the first service signal and the second service signal to a bearing area of an Ethernet physical coding sublayer (PCS) lane, wherein one part of the bearing area of the Ethernet PCS lane bears the first service signal, and another part of the bearing area of the Ethernet PCS lane bears the second service signal, wherein the first service signal and the second service signal correspond to different types of services; and
   transmitting the first service signal and the second service signal that are borne in the bearing area of the Ethernet PCS lane;
   wherein transmitting the first service signal and the second service signal that are borne in the bearing area of the Ethernet PCS lane further comprises: transmitting an indication signal, wherein the indication signal indicates a location of the bearing area of the Ethernet PCS lane.

9. The communications device according to claim 8, wherein the bearing area comprises an overhead bearing area and a payload bearing area; and wherein the overhead bearing area bears bandwidth indication information, wherein the bandwidth indication information indicates bandwidth, occupied by the first service signal, in the payload bearing area.

10. The communications device according to claim 9, wherein the bandwidth indication information is bandwidth granularity quantity information, wherein the bandwidth granularity quantity information indicates a quantity of bandwidth granularities, occupied by the first service signal, in the payload bearing area, wherein each bandwidth granularity has a fixed length.

11. The communications device according to claim 8, wherein the first service signal is a synchronous digital hierarchy (SDH) service signal, an optical transport network (OTN) service signal, or a common public radio interface (CPRI) service signal; and wherein the second service signal is an Ethernet service signal.

12. The communications device according to claim 8, wherein receiving the first service signal and the second service signal comprises:

transmitting a service identifier signal and a clock signal to a transmit end of the first service signal and a transmit end of the second service signal, and receiving the first service signal transmitted by the transmit end of the first service signal and the second service signal transmitted by the transmit end of the second service signal;

wherein when the service identifier signal is a first identifier corresponding to the first service signal, the transmit end of the first service signal transmits the first service signal, and the transmit end of the second service signal does not transmit a service signal; and when the service identifier signal is a second identifier corresponding to the second service signal, the transmit end of the second service signal transmits the second service signal, and the transmit end of the first service signal does not transmit a service signal.

13. The communications device according to claim 8, wherein transmitting the first service signal and the second service signal that are borne in the bearing area of the Ethernet PCS lane comprises:

transmitting the bearing area of the Ethernet PCS lane; and wherein the indication signal further indicates a location of an alignment marker (AM) corresponding to the bearing area.

14. The communications device according to claim 13, wherein the indication signal further indicates a location of an overhead bearing area of the bearing area and a location of a payload bearing area of the bearing area.

15. A communications device, wherein the communications device comprises a processor and a non-transitory memory having processor-executable instructions stored thereon, wherein the processor-executable instructions, when executed by the processor, facilitate:

receiving a service signal transmitted over an Ethernet channel, wherein the service signal comprises a first service signal and a second service signal, wherein the first service signal and the second service signal correspond to different types of services, and wherein one part of a bearing area of an Ethernet physical coding sublayer (PCS) lane of the Ethernet channel bears the first service signal, and another part of the bearing area of the Ethernet PCS lane of the Ethernet channel bears the second service signal; and distributing the first service signal and the second service signal;

wherein receiving the service signal transmitted over the Ethernet channel further comprises: receiving an indication signal, wherein the indication signal indicates a location of the bearing area of the Ethernet PCS lane.

16. The communications device according to claim 15, wherein the bearing area comprises an overhead bearing area and a payload bearing area;

wherein the overhead bearing area bears bandwidth indication information, wherein the bandwidth indication information indicates bandwidth, occupied by the first service signal, in the payload bearing area; and wherein the processor-executable instructions, when executed, further facilitate: obtaining the bandwidth indication information in the overhead bearing area; generating a service identifier signal according to an identifier of the first service signal and an identifier of the second service signal that are locally stored and the bandwidth indication information; and transmitting a clock signal, the service identifier signal, and the bearing area, wherein the service identifier signal indicates locations, occupied by the first service signal and the second service signal, in the payload bearing area.

17. The communications device according to claim 16, wherein the bandwidth indication information is bandwidth granularity quantity information, wherein the bandwidth granularity quantity information indicates a quantity of bandwidth granularities, occupied by the first service signal, in the payload bearing area, wherein each bandwidth granularity has a fixed length.

18. The communications device according to claim 15, wherein the first service signal is a synchronous digital hierarchy (SDH) service signal, an optical transport network (OTN) service signal, or a common public radio interface (CPRI) service signal; and wherein the second service signal is an Ethernet service signal.

* * * * *